(12) United States Patent
Shrestha et al.

(10) Patent No.: US 12,089,113 B2
(45) Date of Patent: Sep. 10, 2024

(54) LOCATION REPORTING FOR USER EQUIPMENT

(71) Applicant: QUALCOMM Incorporated, San Diego, CA (US)

(72) Inventors: Bharat Shrestha, San Diego, CA (US); Liangping Ma, San Diego, CA (US); Xiao Feng Wang, San Diego, CA (US); Alberto Rico Alvarino, San Diego, CA (US); Umesh Phuyal, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 17/491,285

(22) Filed: Sep. 30, 2021

(65) Prior Publication Data
US 2022/0109959 A1    Apr. 7, 2022

Related U.S. Application Data

(60) Provisional application No. 63/088,964, filed on Oct. 7, 2020.

(51) Int. Cl.
*H04W 4/029* (2018.01)
*G01S 5/00* (2006.01)
*G01S 5/02* (2010.01)
*H04B 17/364* (2015.01)

(52) U.S. Cl.
CPC .......... *H04W 4/029* (2018.02); *G01S 5/0027* (2013.01); *G01S 5/0226* (2013.01); *H04B 17/364* (2015.01)

(58) Field of Classification Search
CPC .... H04W 4/029; H04B 17/364; G01S 5/0027; G01S 5/0226
USPC ....................................... 455/456.1
See application file for complete search history.

(56) References Cited

U.S. PATENT DOCUMENTS

| 6,043,777 A | 3/2000 | Bergman et al. |
| 2002/0169539 A1 | 11/2002 | Menard et al. |
| 2013/0036238 A1 | 2/2013 | Chowdhary et al. |
| 2013/0238573 A1* | 9/2013 | Le Pifre ............ G06F 16/1744 707/693 |
| 2013/0337822 A1 | 12/2013 | Rubin et al. |
| 2014/0057645 A1* | 2/2014 | Chowdhary ............ H04W 4/08 455/456.1 |
| 2018/0007513 A1 | 1/2018 | Chen et al. |

(Continued)

FOREIGN PATENT DOCUMENTS

WO    WO-0028347 A1    5/2000

OTHER PUBLICATIONS

Partial International Search Report—PCT/US2021/053171—ISA/EPO—May 10, 2022.

(Continued)

*Primary Examiner* — Ted M Wang
(74) *Attorney, Agent, or Firm* — Holland & Hart LLP

(57) ABSTRACT

Methods, systems, and devices for wireless communications are described. A base station may request a user equipment (UE) to report location information for the UE using a specific format. The UE may report the location information to the base station based on the request. The base station may use the location information reported by the UE to determine the location of the UE.

20 Claims, 21 Drawing Sheets

(56) References Cited

U.S. PATENT DOCUMENTS

2020/0259683 A1  8/2020  Manolakos et al.

OTHER PUBLICATIONS

International Search Report and Written Opinion—PCT/US2021/053171—ISA/EPO—Sep. 13, 2022.
Nadia Brahmi (Bosch) Deliverable D3., et al., "Fifth Generation Communication-Automotive Research and Innovation Deliverable D3.3 Final SG V2X Radio Design", SGCAR, Nov. 30, 2019, pp. 1-148, XP055775688, Retrieved from the Internet: URL: [retrieved on Feb. 12, 2021] p. 89.

* cited by examiner

LOCATION REPORTING FOR USER EQUIPMENT

CROSS REFERENCE

The present Application for Patent claims the benefit of U.S. Provisional Patent Application No. 63/088,964 by Shrestha et al., entitled "LOCATION REPORTING FOR USER EQUIPMENT," filed Oct. 7, 2020, assigned to the assignee hereof, and expressly incorporated by reference herein.

FIELD OF TECHNOLOGY

The following relates to wireless communications, including location reporting for a user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support non-terrestrial networks, which may provide broad coverage areas by using high-altitude vehicles (e.g., satellites or other non-terrestrial-based high-altitude equipment) between base stations and UEs or by having base stations on board of the high-altitude vehicles (e.g., satellites). The use of high-altitude vehicles may provide benefits and challenges for different aspects of wireless communications.

SUMMARY

The described techniques relate to improved methods, systems, devices, and apparatuses that support location reporting for a user equipment (UE). Using a first technique, a base station may determine the approximate location of a UE by using the propagation delay between the UE and the base station to determine a path along which the UE is located. The base station may leverage additional techniques to approximately locate the UE on the path. In a second example, the base station may determine the approximate location of the UE by using a directional antenna to scan for uplink reference signals from the UE. In a third example, the base station may determine the location of the UE based on a truncated version of the geographic coordinates for the UE. In a fourth example, the base station may determine the location of the UE based on a difference between the location of the UE and a reference location. In a fifth example, the base station may determine the location of the UE based on a timing advance for the UE and an angle of the UE relative to a reference line.

A method of wireless communication at an apparatus, such as a UE, is described. The method may include receiving, from a base station, a request for the UE to report condensed location information of the UE to the base station, the condensed location information including fewer bits than information associated with a full global navigation satellite system coordinate of the UE, determining a location of the UE based on receiving the request, and transmitting, to the base station, the condensed location information based on the determination of the location of the UE and the request.

An apparatus, such as a UE, for wireless communication is described. The apparatus may include a processing system comprising at least one processor and memory coupled with the at least one processor. The processing system may be configured to obtain, from a base station, a request for the UE to report condensed location information of the UE to the base station, the condensed location information including fewer bits than information associated with a full global navigation satellite system coordinate of the UE, determine a location of the UE based on obtaining the request, and output, for transmission to the base station, the condensed location information based on the determination of the location of the UE and the request. In some examples, the processing system includes a receiver configured to receive the request and a transmitter configured to transmit the condensed location information.

Another apparatus, such as a UE, for wireless communication is described. The apparatus may include means for receiving, from a base station, a request for the UE to report condensed location information of the UE to the base station, the condensed location information including fewer bits than information associated with a full global navigation satellite system coordinate of the UE, determining a location of the UE based on receiving the request, and transmitting, to the base station, the condensed location information based on the determination of the location of the UE and the request.

A non-transitory computer-readable medium storing code for wireless communication at a UE is described. The code may include instructions executable by a processor to receive, from a base station, a request for the UE to report condensed location information of the UE to the base station, the condensed location information including fewer bits than information associated with a full global navigation satellite system coordinate of the UE, determine a location of the UE based on receiving the request, and transmit, to the base station, the condensed location information based on the determination of the location of the UE and the request.

In some examples of the method, apparatuses, and non-transitory computer-readable medium described herein, determining the location of the UE may include operations, features, means, or instructions for determining a geographic coordinate including a set of digits, where the request indicates a subset of digits of the set of digits and the condensed location information includes a truncated version of the geographic coordinate that may be based on the subset of digits.

In some examples of the method, apparatuses, and non-transitory computer-readable medium described herein, the geographic coordinate represents a longitude of the UE or a latitude of the UE.

In some examples of the method, apparatuses, and non-transitory computer-readable medium described herein, determining the location of the UE may include operations, features, means, or instructions for determining a coordinate differential including a difference between a first geographic coordinate of a reference location and a second geographic coordinate of the UE, where the request indicates the reference location and the condensed location information includes the coordinate differential.

Some examples of the method, apparatuses, and non-transitory computer-readable medium described herein may further include operations, features, means, or instructions for receiving the first geographic coordinate of the reference location from the base station, where determining the coordinate differential may be based on receiving the first geographic coordinate of the reference location.

In some examples of the method, apparatuses, and non-transitory computer-readable medium described herein, determining the location of the UE may include operations, features, means, or instructions for determining an angle associated with the location of the UE relative to a reference ray with a starting point at the reference location, where the request indicates the reference ray and the condensed location information includes the angle.

Some examples of the method, apparatuses, and non-transitory computer-readable medium described herein may further include operations, features, means, or instructions for receiving, from the base station, an indication of a reference location and an orientation of the reference ray associated with the reference location, where the reference ray may be determined based on receiving the indication of the reference location and the orientation.

Some examples of the method, apparatuses, and non-transitory computer-readable medium described herein may further include operations, features, means, or instructions for receiving, from the base station, an indication of a reference location, and determining, by the UE, an orientation of the reference ray associated with the reference location, where the reference ray may be determined based on the reference location and the orientation.

In some examples of the method, apparatuses, and non-transitory computer-readable medium described herein, the location information may be transmitted during a random access procedure or after the random access procedure is successfully completed (e.g., during a radio resource control connected state).

A method of wireless communication at an apparatus, such as a base station, is described. The method may include transmitting, to a UE, a request for the UE to report condensed location information of the UE to the base station, the condensed location information including fewer bits than information associated with a full global navigation satellite system coordinate of the UE, receiving the condensed location information based on transmitting the request, determining a location of the UE based on the condensed location information, and communicating with the UE based at least in part on the location of the UE.

An apparatus, such as a base station, for wireless communication is described. The apparatus may include a processing system comprising at least one processor and memory coupled with the at least one processor. The processing system may be configured to output, for transmission to a UE, a request for the UE to report condensed location information of the UE to the base station, the condensed location information including fewer bits than information associated with a full global navigation satellite system coordinate of the UE, obtain the condensed location information based on outputting the request, determine a location of the UE based on the condensed location information, and communicate with the UE based at least in part on the location of the UE.

Another apparatus, such as a base station, for wireless communication is described. The apparatus may include means for transmitting, to a UE, a request for the UE to report condensed location information of the UE to the base station, the condensed location information including fewer bits than information associated with a full global navigation satellite system coordinate of the UE, receiving the condensed location information based on transmitting the request, determining a location of the UE based on the condensed location information, and communicating with the UE based at least in part on the location of the UE.

A non-transitory computer-readable medium storing code for wireless communication at a base station is described. The code may include instructions executable by a processor to transmit, to a UE, a request for the UE to report condensed location information of the UE to the base station, the condensed location information including fewer bits than information associated with a full global navigation satellite system coordinate of the UE, receive the condensed location information based on transmitting the request, determine a location of the UE based on the condensed location information, and communicate with the UE based at least in part on the location of the UE.

Some examples of the method, apparatuses, and non-transitory computer-readable medium described herein may further include operations, features, means, or instructions for determining a subset of digits of a geographic coordinate based on a threshold precision for a beam management procedure with the UE, where the request indicates the subset of digits and the condensed location information includes a truncated version of the geographic coordinate that may be based on the subset of digits.

Some examples of the method, apparatuses, and non-transitory computer-readable medium described herein may further include operations, features, means, or instructions for determining a coverage area of a transmission beam of the base station, where the threshold precision may be based on a size of the coverage area, a shape of the coverage area, or a combination thereof.

Some examples of the method, apparatuses, and non-transitory computer-readable medium described herein may further include operations, features, means, or instructions for transmitting to the UE a first geographic coordinate for a reference location, where the condensed location information includes a coordinate differential including a difference between the first geographic coordinate of the reference location and a second geographic coordinate of the UE.

Some examples of the method, apparatuses, and non-transitory computer-readable medium described herein may further include operations, features, means, or instructions for selecting a center of a transmission beam of the base station as the reference location.

In some examples of the method, apparatuses, and non-transitory computer-readable medium described herein, determining the location of the UE may include operations, features, means, or instructions for determining an angle of a position of the UE relative to a reference ray, where the request indicates the reference ray and the condensed location information includes the angle, where the location of the UE may be based on the angle.

Some examples of the method, apparatuses, and non-transitory computer-readable medium described herein may further include operations, features, means, or instructions for determining a propagation delay between the UE and the base station, where the location of the UE may be determined based on the propagation delay and the angle.

Some examples of the method, apparatuses, and non-transitory computer-readable medium described herein may further include operations, features, means, or instructions for transmitting, to the UE, an indication of a reference location associated with the reference ray, where the angle may be based on the reference location and the orientation of the reference ray.

A method of wireless communication at an apparatus, such as a UE, is described. The method may include receiving from a base station a request for the UE to report condensed location information, determining the condensed location information based on the request, transmitting the location information to the base station, and performing a random access procedure with the base station, wherein the condensed location information is transmitted during the random access procedure or after the random access procedure is successfully completed.

An apparatus, such as a UE, for wireless communication is described. The apparatus may include a processing system comprising at least one processor and memory coupled with the at least one processor. The processing system may be configured to obtain from a base station a request for the UE to report condensed location information, determine the condensed location information based on the request, output the condensed location information for transmission to the base station, and perform a random access procedure with the base station, wherein the condensed location information is output during the random access procedure or after the random access procedure is successfully completed.

Another apparatus, such as a UE, for wireless communication is described. The apparatus may include means for receiving from a base station a request for the UE to report condensed location information, determining the condensed location information based on the request, transmitting the location information to the base station, and perform a random access procedure with the base station, wherein the condensed location information is transmitted during the random access procedure or after the random access procedure is successfully completed.

A non-transitory computer-readable medium storing code for wireless communication at a UE is described. The code may include instructions executable by a processor to receive from a base station a request for the UE to report condensed location information, determine the condensed location information based on the request, transmit the condensed location information to the base station, and perform a random access procedure with the base station, wherein the condensed location information is transmitted during the random access procedure or after the random access procedure is successfully completed.

In some examples of the method, apparatuses, and non-transitory computer-readable medium described herein, the random access procedure includes a four-step random access procedure and the condensed location information may be included in Message 5 of the four-step random access procedure.

In some examples of the method, apparatuses, and non-transitory computer-readable medium described herein, the random access procedure includes a two-step random access procedure and the condensed location information may be included in Message A or a third message (e.g., Message 3) of the two-step random access procedure.

In some examples of the method, apparatuses, and non-transitory computer-readable medium described herein, the request may be included in a SIB broadcast by the base station.

Some examples of the method, apparatuses, and non-transitory computer-readable medium described herein may further include operations, features, means, or instructions for determining a second cell associated with a strongest signal relative to cells other than the first cell, where the condensed location information includes an identifier of the second cell.

Some examples of the method, apparatuses, and non-transitory computer-readable medium described herein may further include operations, features, means, or instructions for determining a set of cells each associated with a respective signal strength that satisfies a threshold, where the condensed location information includes identifiers of the set of cells.

Some examples of the method, apparatuses, and non-transitory computer-readable medium described herein may further include operations, features, means, or instructions for determining a timing advance between the UE and the base station, where the condensed location information includes an indication of the timing advance.

Some examples of the method, apparatuses, and non-transitory computer-readable medium described herein may further include operations, features, means, or instructions for determining a reception timing for a downlink transmission from the base station and a transmission timing for an uplink transmission to the base station in response to the downlink transmission, where the condensed location information comprises an indication of a timing difference between the reception timing and the transmission timing.

Some examples of the method, apparatuses, and non-transitory computer-readable medium described herein may further include operations, features, means, or instructions for determining a second timing advance between the UE and a second base station, and transmitting an indication of the second timing advance to the base station based on transmitting the indication of the timing advance. In some examples of the method, apparatuses, and non-transitory computer-readable medium described herein, the condensed location information further comprises a direction of the apparatus with respect to a reference location and one or more indications of timing advances associated with different time intervals.

Some examples of the method, apparatuses, and non-transitory computer-readable medium described herein may further include operations, features, means, or instructions for determining, based at least in part on location information for the UE, a position of the UE relative to a reference location indicated by the base station, where the condensed location information indicates a direction of the apparatus with respect to the reference location. Some examples of the method, apparatuses, and non-transitory computer-readable medium described herein may further include operations, features, means, or instructions for determining, based at least in part on location information for the UE, a tracking area code for a tracking area associated with a position of the UE relative to a reference location indicated by the base station, where the condensed location information indicates the tracking area code. Some examples of the method, apparatuses, and non-transitory computer-readable medium described herein may further include operations, features, means, or instructions for determining, based at least in part on location information, an identifier for a zone in which the UE is positioned relative to a reference location indicated by the base station, where the condensed location information indicates the identifier for the zone.

Some examples of the method, apparatuses, and non-transitory computer-readable medium described herein may further include operations, features, means, or instructions for determining a direction of the UE relative to a center of a coverage area of a transmission beam of the base station, where the condensed location information includes the direction.

Some examples of the method, apparatuses, and non-transitory computer-readable medium described herein may further include operations, features, means, or instructions for determining an angle associated with the UE relative to a reference ray indicated by the base station, where the condensed location information includes the angle.

Some examples of the method, apparatuses, and non-transitory computer-readable medium described herein may further include operations, features, means, or instructions for receiving, from the base station during the random access procedure, a second indication to transmit a reference signal for identifying a location of the UE, and transmitting the reference signal based on the indication.

A method of wireless communication at an apparatus, such as a base station, is described. The method may include performing a random access procedure with a UE, transmitting, to the UE during the random access procedure or after the random access procedure is successfully completed, a request for the UE to report condensed location information, receiving the condensed location information from the UE during the random access procedure or after the random access procedure is successfully completed, and determining a location of the UE based on the condensed location information.

An apparatus, such as a base station, for wireless communication including is described. The apparatus may include a processing system comprising at least one processor and memory coupled with the at least one processor. The processing system may be configured to perform a random access procedure with a UE, output, for transmission to the UE during the random access procedure or after the random access procedure is successfully completed, a request for the UE to report condensed location information, obtain the condensed location information from the UE during the random access procedure or after the random access procedure is successfully completed, and determine a location of the UE based on the condensed location information.

Another apparatus, such as a base station, for wireless communication is described. The apparatus may include means for performing a random access procedure with a UE, transmitting, to the UE during the random access procedure or after the random access procedure is successfully completed, a request for the UE to report condensed location information, receiving the condensed location information from the UE during the random access procedure or after the random access procedure is successfully completed, and determining a location of the UE based on the condensed location information.

A non-transitory computer-readable medium storing code for wireless communication at a base station including is described. The code may include instructions executable by a processor to perform a random access procedure with a UE, transmit, to the UE during the random access procedure or after the random access procedure is successfully completed, a request for the UE to report condensed location information, receive the condensed location information from the UE during the random access procedure or after the random access procedure is successfully completed, and determine a location of the UE based on the condensed location information.

In some examples of the method, apparatuses, and non-transitory computer-readable medium described herein, the random access procedure includes a four-step random access procedure and the condensed location information may be included in Message 5 of the four-step random access procedure.

In some examples of the method, apparatuses, and non-transitory computer-readable medium described herein, the random access procedure includes a two-step random access procedure and the condensed location information may be included in Message A or Message 3 of the two-step random access procedure.

In some examples of the method, apparatuses, and non-transitory computer-readable medium described herein, the request may be included in a SIB broadcast by the base station.

In some examples of the method, apparatuses, and non-transitory computer-readable medium described herein, determining the location of the UE may include operations, features, means, or instructions for determining a distance between the UE and the base station based on a timing advance between the UE and the base station.

In some examples of the method, apparatuses, and non-transitory computer-readable medium described herein, the base station may be associated with a first cell, and where receiving the condensed location information may include operations, features, means, or instructions for receiving an identifier of a second cell associated with a strongest signal relative to cells other than the first cell, where determining the location of the UE may be based on the identifier of the second cell.

In some examples of the method, apparatuses, and non-transitory computer-readable medium described herein, receiving the condensed location information may include operations, features, means, or instructions for receiving identifiers of a set of cells each associated with a respective signal strength that satisfies a threshold, where determining the location of the may be UE based on the identifiers of the set of cells.

In some examples of the method, apparatuses, and non-transitory computer-readable medium described herein, receiving the condensed location information may include operations, features, means, or instructions for receiving an indication of a timing advance between the UE and the base station, where the location of the UE may be determined based on the timing advance.

In some examples of the method, apparatuses, and non-transitory computer-readable medium described herein, receiving the condensed location information may include operations, features, means, or instructions for receiving an indication of a second timing advance between the UE and a second base station, where determining the location of the UE may be based on the second timing advance.

In some examples of the method, apparatuses, and non-transitory computer-readable medium described herein, receiving the condensed location information may include operations, features, means, or instructions for receiving a direction of the UE relative to a center of a coverage area, where determining the location of the UE may be based on the direction.

In some examples of the method, apparatuses, and non-transitory computer-readable medium described herein, receiving the condensed location information may include operations, features, means, or instructions for receiving an angle associated with the UE relative to a reference ray indicated by the base station, where determining the location of the UE based on the angle.

Some examples of the method, apparatuses, and non-transitory computer-readable medium described herein may further include operations, features, means, or instructions for transmitting, to the UE during the random access procedure, a second request to transmit a reference signal, and receiving the reference signal from the UE, where determining the location of the UE may be based on an angle of arrival for the reference signal.

A method of wireless communication at an apparatus, such as a UE, is described. The method may include receiving, from a base station before a radio resource control connection is established with the UE, a request for the UE to transmit a reference signal for identifying a location of the UE and transmitting the reference signal based on the request received from the base station, where the reference signal is transmitted before or after the radio resource control connection is established.

An apparatus, such as a UE, for wireless communication is described. The apparatus may include a processing system comprising at least one processor and memory coupled with the at least one processor. The processing system may be configured to obtain, from a base station before a radio resource control connection is established with the UE, a request for the UE to transmit a reference signal for identifying a location of the UE and output for transmission the reference signal based on the request obtained from the base station, where the reference signal is outputted before or after the radio resource control connection is established.

Another apparatus, such as a UE, for wireless communication is described. The apparatus may include means for receiving, from a base station before a radio resource control connection is established with the UE, a request for the UE to transmit a reference signal for identifying a location of the UE and transmitting the reference signal based on the request received from the base station, where the reference signal is transmitted before or after the radio resource control connection is established.

A non-transitory computer-readable medium storing code for wireless communication at a UE is described. The code may include instructions executable by a processor to receive, from a base station before a radio resource control connection is established with the UE, a request for the UE to transmit a reference signal for identifying a location of the UE and transmit the reference signal based on the request received from the base station, where the reference signal is transmitted before or after the radio resource control connection is established.

In some examples of the method, apparatuses, and non-transitory computer-readable medium described herein, the request may be included in Message 2 or Message 4 of a random access procedure.

In some examples of the method, apparatuses, and non-transitory computer-readable medium described herein, the request indicates a periodicity for transmitting the reference signal, and where transmitting the reference signal may include operations, features, means, or instructions for transmitting the reference signal according to the periodicity indicated by the request.

In some examples of the method, apparatuses, and non-transitory computer-readable medium described herein, the request indicates a quantity of times the UE may be to transmit the reference signal, and where transmitting the reference signal may include operations, features, means, or instructions for transmitting the reference signal the quantity of times indicated by the request.

Some examples of the method, apparatuses, and non-transitory computer-readable medium described herein may further include operations, features, means, or instructions for receiving from the base station an instruction to stop transmitting the reference signal.

In some examples of the method, apparatuses, and non-transitory computer-readable medium described herein, the request indicates a duration of time for the UE to periodically transmit the reference signal, and where transmitting the reference signal may include operations, features, means, or instructions for transmitting the reference signal periodically for the duration of time.

Some examples of the method, apparatuses, and non-transitory computer-readable medium described herein may further include operations, features, means, or instructions for determining a timing advance between the UE and the base station based on receiving the request, and transmitting an indication of the timing advance to the base station.

A method of wireless communication at an apparatus, such as a base station, is described. The method may include transmitting, to a UE in a coverage area of the base station, a request for the UE to transmit a reference signal periodically, monitoring a portion of the coverage area for the reference signal based on transmitting the request, and determining a location of the UE within the coverage area based on monitoring the portion of the coverage area for the reference signal.

An apparatus, such as a base station, for wireless communication is described. The apparatus may include a processing system comprising at least one processor and memory coupled with the at least one processor. The processing system may be configured to output, for transmission to a UE in a coverage area of the base station, a request for the UE to transmit a reference signal periodically, output an indication to monitor a portion of the coverage area for the reference signal based on outputting the request, and determine a location of the UE within the coverage area based on monitoring the portion of the coverage area for the reference signal.

Another apparatus, such as a base station, for wireless communication is described. The apparatus may include means for transmitting, to a UE in a coverage area of the base station, a request for the UE to transmit a reference signal periodically, monitoring a portion of the coverage area for the reference signal based on transmitting the request, and determining a location of the UE within the coverage area based on monitoring the portion of the coverage area for the reference signal.

A non-transitory computer-readable medium storing code for wireless communication at a base station including is described. The code may include instructions executable by a processor to transmit, to a UE in a coverage area of the base station, a request for the UE to transmit a reference signal periodically, monitor a portion of the coverage area for the reference signal based on transmitting the request, and determine a location of the UE within the coverage area based on monitoring the portion of the coverage area for the reference signal.

Some examples of the method, apparatuses, and non-transitory computer-readable medium described herein may further include operations, features, means, or instructions for determining that the coverage area spans multiple countries, where the request may be transmitted based on determining that the coverage area spans multiple countries.

Some examples of the method, apparatuses, and non-transitory computer-readable medium described herein may further include operations, features, means, or instructions for receiving the reference signal based on monitoring the portion of the coverage area, where the location of the UE may be determined to be in the portion of the coverage area based on receiving the reference signal.

Some examples of the method, apparatuses, and non-transitory computer-readable medium described herein may further include operations, features, means, or instructions for determining a second location that may be covered by the second coverage area when the reference signal may be received, where the location of the UE may be determined based on the second location that may be covered by the second coverage area.

Some examples of the method, apparatuses, and non-transitory computer-readable medium described herein may further include operations, features, means, or instructions for determining that the base station may have not received the reference signal while monitoring the portion of the coverage area, where the location of the UE may be determined to be in a second portion of the coverage area based on not receiving the reference signal.

Some examples of the method, apparatuses, and non-transitory computer-readable medium described herein may further include operations, features, means, or instructions for receiving an indication of a timing advance between the UE and the base station based on the request, and determining the portion of the coverage area to monitor based on the timing advance.

DETAILED DESCRIPTION

Figure 1:
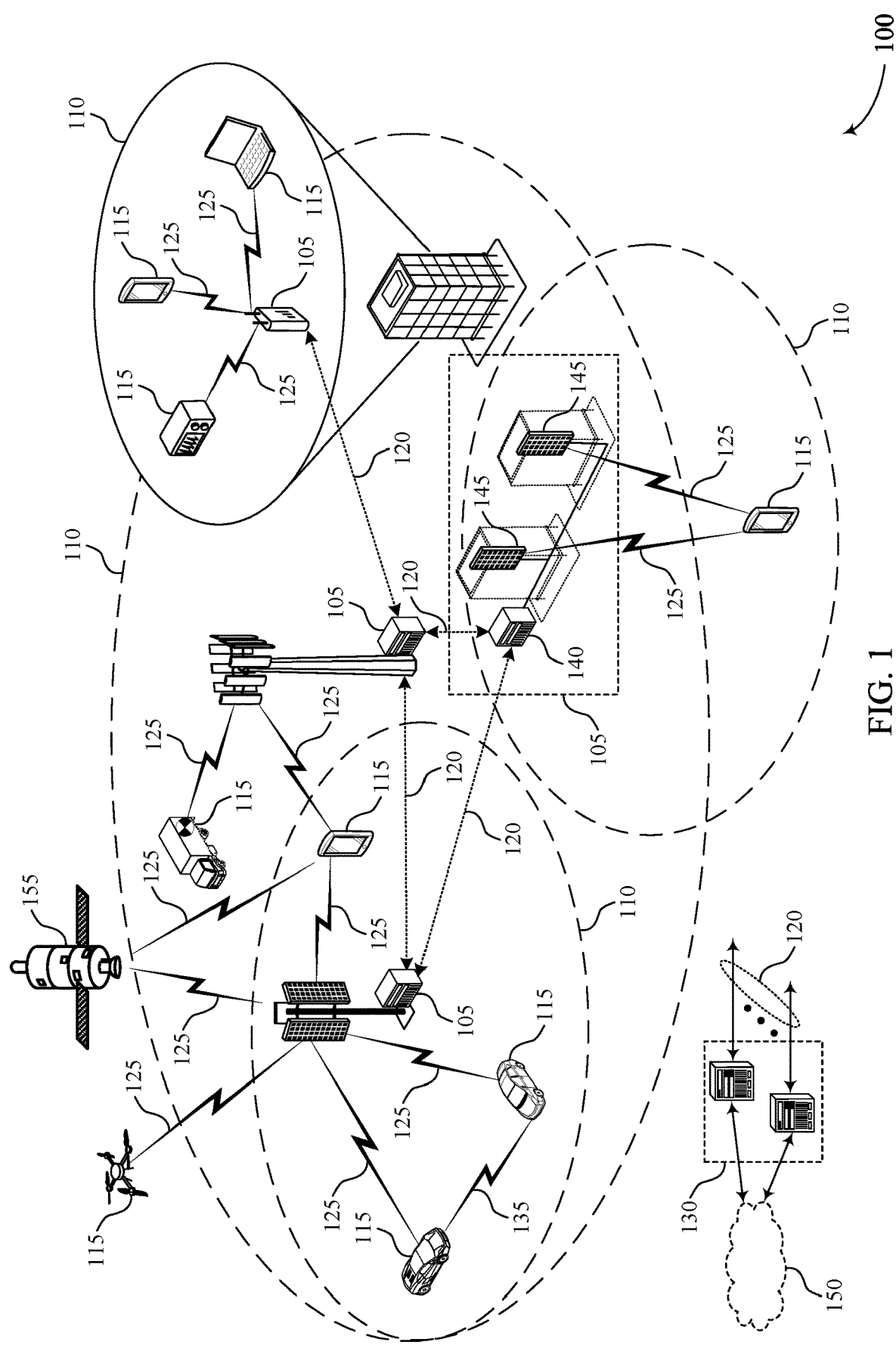
FIG. 1 illustrates an example of a system for wireless communications that supports location reporting for a UE in accordance with aspects of the present disclosure.

A non-terrestrial network (NTN) may provide wireless communications coverage to a user equipment (UE) via non-terrestrial base stations that are associated with high-altitude vehicles, such as a satellites. In some cases, the non-terrestrial base stations are coupled with the high-altitude vehicles, the non-terrestrial base stations may be implemented by the high-altitude vehicles, or a combination thereof. Before establishing a connection with a UE, a non-terrestrial base station may determine the country of the UE so that the non-terrestrial base station can access and provide connectivity to the proper core network (e.g., the core network belonging to the country of the UE), among other reasons. But the country of the UE may not be apparent if the coverage area of the non-terrestrial base station spans multiple countries or portions of multiple countries.

According to the techniques described herein, a non-terrestrial base station may determine the approximate location of a UE, and thus the country of the UE, using one or more techniques. In Technique 1, a base station may determine the approximate location of a UE by using the propagation delay between the UE and the base station to determine a path along which the UE is located. The base station may leverage additional techniques to approximately locate the UE on the path. In Technique 2, a base station may determine the approximate location of a UE by using a directional antenna to scan for uplink reference signals from the UE.

After establishing a connection with a UE, a base station may perform beam management (e.g., beam switching) so that connectivity with the UE is maintained at or above a threshold quality. Among other parameters, a base station may use the location of a UE to effectively perform beam management. For example, the base station may perform beam management using geographic coordinates, such as Global Navigation Satellite System (GNSS) coordinates, reported by the UE. But the geographic coordinates reported by the UE may include many digits, which may increase the size (e.g., quantity of bits) of location information reported from the UE.

According to the techniques described herein, a non-terrestrial base station may determine the location of a UE using one or more techniques. In Technique 3, a base station may reduce the size of location information reported by a UE by instructing the UE to report a truncated version of the geographic coordinates for the UE. In Technique 4, a base station may further reduce the size of location information reported by a UE by instructing the UE to report the difference between the geographic coordinates of the UE and the geographic coordinates of a reference point. In Technique 5, a base station may reduce the size of location information reported by a UE by instructing the UE to report an angle of the UE relative to a reference line.

Aspects of the disclosure are initially described in the context of a wireless communications system. Aspects of the disclosure are further described in the context of an additional wireless communications systems and process flows. Aspects of the disclosure are further illustrated by and described with reference to apparatus diagrams, system diagrams, and flowcharts.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

FIG. 1 illustrates an example of a wireless communications system 100 that supports location reporting for a UE in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may also include one or more satellites 155 (e.g., in a non-terrestrial network (NTN) configuration), which may communicate with base stations 105 or the core network 130 via gateways (e.g., ground-based terminals, NTN gateways). Satellites 155 may also communicate with UEs 115, which may include other high altitude or terrestrial communications devices. In various examples, a satellite 155 itself may be an example of a base station 105 (e.g., supporting a gNB processed payload), or a satellite 155 may provide a relay of signals between a base station 105 and UEs 115 (e.g., in a transparent satellite configuration, where a satellite 155 and a gateway may be configured together as a remote radio unit). A satellite 155 may be any suitable type of communication satellite configured to relay or otherwise support communications between different devices in the wireless communications system 100. A satellite 155 may be an example of a space satellite, a balloon, a dirigible, an airplane, a drone, an unmanned aerial vehicle, or other vehicle which may support communications from a generally non-terrestrial, overhead, or elevated position. In some examples, a satellite 155 may be in a geosynchronous or geostationary earth orbit, a low earth orbit, or a medium earth orbit. A satellite 155 may be a multi-beam satellite configured to provide service for multiple service beam coverage areas in a configured geographical service area. The satellite 155 may be any distance away from the surface of the earth or other reference surface.

Before establishing a connection with a UE 115, a base station (aboard a satellite 155) may determine the approximate location of the UE 115 (e.g., so that the base station can select the appropriate core network to access on behalf of the UE 115). For example, to comply with various regulations or for other purposes, the base station may determine the country of the UE 115 so that the base station can select the core network of that country to access. To determine the approximate location of the UE 115 (and thus the country of the UE 115), the base station may implement aspects of Technique 1 and/or Technique 2 as described herein and with respect to FIGS. 6 and 7, respectively. In Technique 1, a base station 105 may determine the approximate location of a UE 115 by using the propagation delay between the UE 115 and the base station 105 to determine a path along which the UE 115 is located. The base station 105 may leverage additional techniques to approximately locate the UE 115 on the path. In Technique 2, a base station 105 may determine the approximate location of a UE 115 by using a directional antenna to scan for an uplink reference signal from the UE 115.

Upon connecting with the UE 115, the base station may perform additional location techniques to further refine the location of the UE 115, which may facilitate beam management techniques. For example, the base station may implement aspects of Technique 3, Technique 4, and/or Technique 5 as described herein and with respect to FIGS. 3, 4, and 5, respectively. In Technique 3, a base station 105 may determine the location of a UE 115 based on a truncated version of the geographic coordinates for the UE 115. In Technique 4, a base station may determine the location of a UE 115 based on a difference between the geographic coordinates of the UE 115 and the geographic coordinates of a reference point. In Technique 5, a base station 105 may determine the location of a UE 115 based on a timing advance for the UE 115 and an angle of the UE 115 relative to a reference line.

Aspects of the location techniques described herein may be used together or for different purposes or at different times than those described. Additionally, the location techniques described herein may be implemented by types of base stations other than non-terrestrial base stations, such as terrestrial base stations. Accordingly, it follows that the location techniques described herein may be implemented in networks other than non-terrestrial networks. Further, the techniques described herein may be partially or wholly implemented before a random access procedure, during a random access procedure, or after a random access procedure has been successfully completed. Thus, the techniques described herein may be partially or wholly implemented before a radio resource control (RRC) connection is established, during establishment of an RRC connection, or after establishment of an RRC connection (e.g., after random access has been successfully completed).

Figure 2:
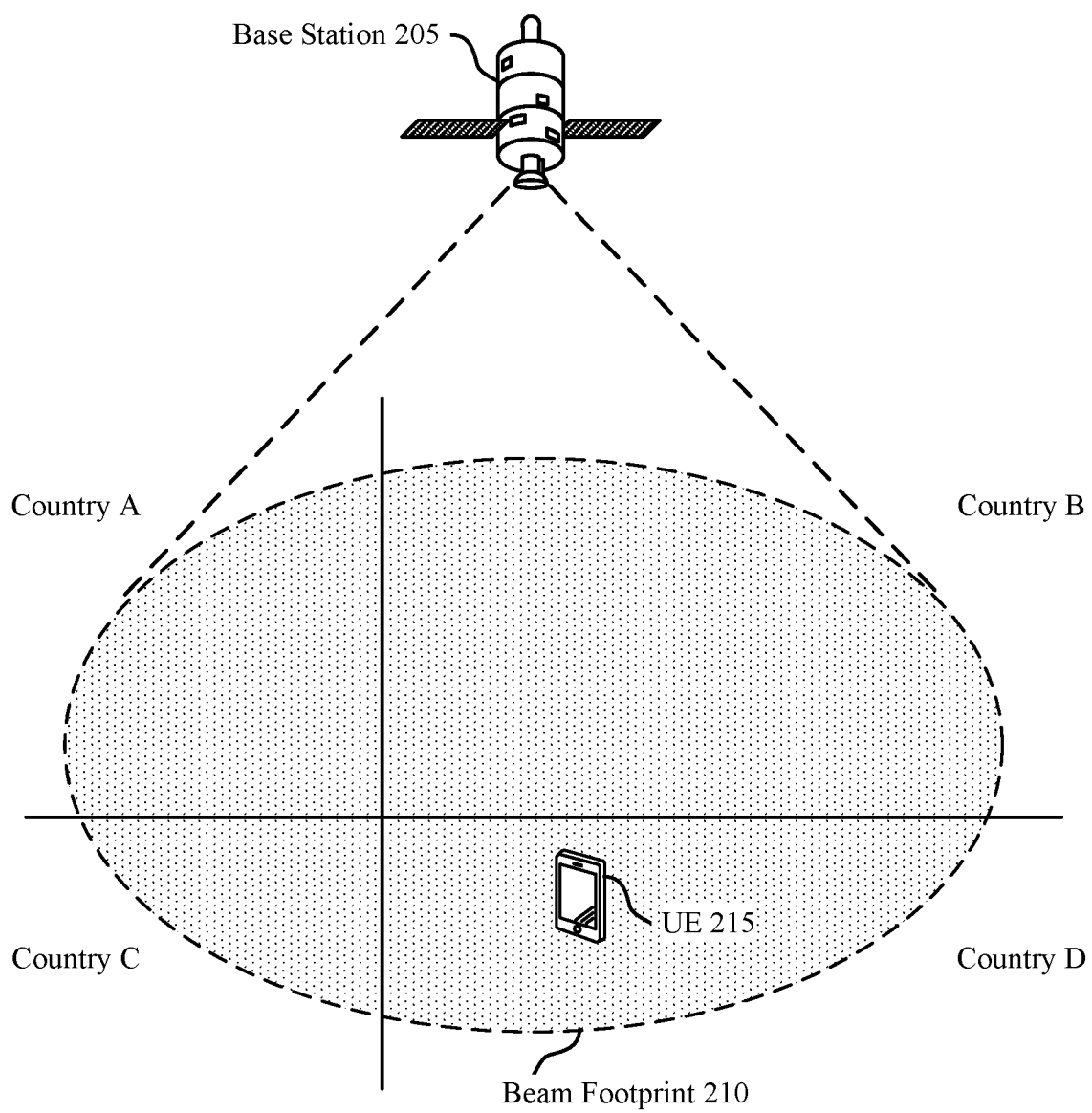
FIG. 2 illustrates an example of a wireless communications system that supports location reporting for a UE in accordance with aspects of the present disclosure.

FIG. 2 illustrates an example of a wireless communications system 200 that supports location reporting for a UE in accordance with aspects of the present disclosure. In some examples, the wireless communications system 200 may implement aspects of the wireless communications system 100. For example, the wireless communications system 200 may include a base station 205 and a UE 215, which may be examples of a base station 105 and a UE 115 as described with reference to FIG. 1. The base station 205 may implement the location techniques described herein to determine the approximate and accurate locations of the UE 215, which may enable core network access and beam management, among other benefits.

The base station 205 may be a non-terrestrial base station that is associated with a satellite. Although illustrated with reference to a UE and a non-terrestrial base station operating in a non-terrestrial network, the location techniques described herein may be implemented by a UE and terrestrial base station operating in a terrestrial network.

The base station 205 may provide wireless communications coverage over a large geographical area by using multiple transmission beams. For example, the base station 205 may use different transmission beams to serve (e.g., provide connectivity to) different geographical areas. The area served by a transmission beam may be referred to as a beam footprint or beam coverage area and the collective area served by the base station 205 may be referred to as the coverage area of the base station 205.

In some examples, one or more beam footprints of the base station 205 may span multiple countries or portions of multiple countries. For example, beam footprint 210 may span portions of Country A, Country B, Country C, and Country D. When a beam footprint spans multiple countries or portions of multiple countries, the base station 205 may perform aspects of Technique 1 and/or Technique 2 to determine the approximate location (and thus country) of the UE 215 so that the base station 205 can access the proper core network, among other reasons. In some instances, UEs in a particular jurisdiction may be asked to couple with a core network associated with that same jurisdiction. Using a non-terrestrial network may create routing challenges for different jurisdictions not presented for terrestrial networks.

For example, the base station 205 may use Technique 1 or Technique 2 to determine that the UE 215 is in country D. Accordingly, the base station 205 may access the core network of country D on behalf of the UE 215. In some examples, the base station 105 may perform aspects of Technique 1 and/or Technique 2 when the beam footprint 210 spans a single country or for purposes other than those described herein.

Once a connection has been established with UE 215 the base station 205 may use additional (e.g., more accurate) location techniques to enable effective beam management techniques, among other benefits. For example, the base station 205 may perform aspects of Technique 3, Technique 4, and/or Technique 5 to determine the accurate location of the UE 215, which may inform beam switching. As an illustration, the base station 205 may use Technique 3, Technique 4, or Technique 5 to determine that the UE 215 is at a location near the edge of beam footprint 210, which may enable the base station 205 to switch the UE 215 to a beam footprint adjacent to beam footprint 210.

Thus, the base station 205 may implement the techniques described herein to determine the approximate and accurate locations of the UE 215. Using Technique 1, the base station 205 may determine the approximate location of the UE 215 by using the propagation delay between the UE 215 and the base station 205 to determine a distance between the non-terrestrial base station and thereby determine a path along which the UE 215 is located. The base station 205 may leverage additional techniques to approximately locate the UE 215 on the path. Using Technique 2, the base station 205 may determine the approximate location of the UE 215 by using a directional antenna to scan for an uplink reference signal from the UE 215. Using Technique 3, the base station 205 may determine the location of the UE 215 based on a truncated version of the geographic coordinates for the UE 215. Using Technique 4, the base station 205 may determine the location of the UE 215 based on a difference between the location of the UE 215 and the location of a reference point. Using Technique 5, the base station 105 may determine the location of the UE 215 based on a timing advance for the UE 215 and an angle of the UE 215 relative to a reference line.

The techniques described herein may be partially or wholly implemented before a random access procedure, during a random access procedure, or after a random access procedure has been successfully completed. Thus, the techniques described herein may be partially or wholly implemented before an RRC connection is established, during establishment of an RRC connection, or after establishment of an RRC connection.

Figure 3:
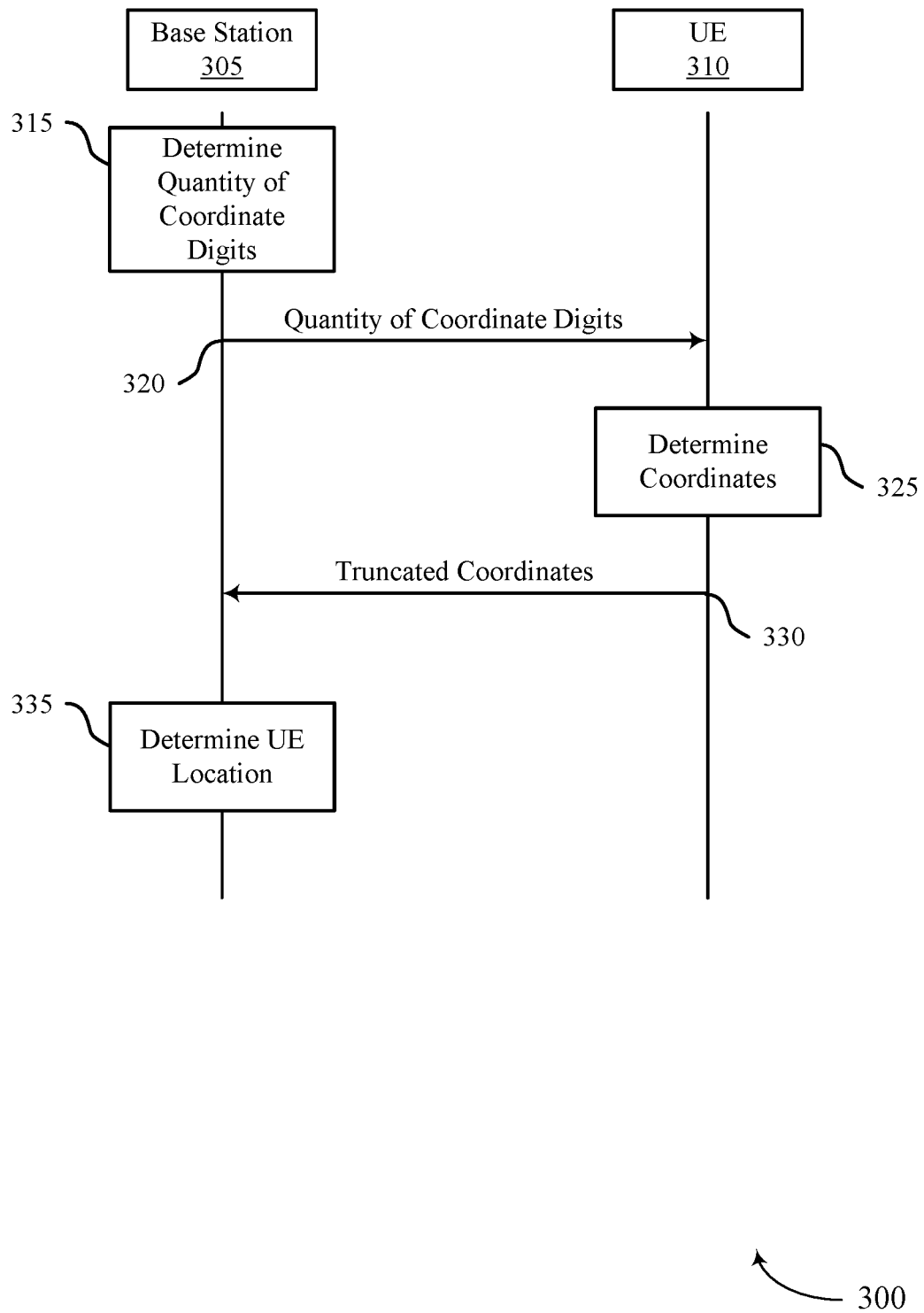
FIG. 3 illustrates an example of a process flow that supports location reporting for a UE in accordance with aspects of the present disclosure.

FIG. 3 illustrates an example of a process flow 300 that supports location reporting for a UE in accordance with aspects of the present disclosure. In some examples, process flow 300 may implement aspects of wireless communications systems 100 or 200. For example, process flow 300 may be implemented by a base station 305 and a UE 310, which may be examples of a base station (terrestrial or non-terrestrial) or a UE as described herein. Process flow 300 may represent aspects of Technique 3 and thus may support the base station 305 using truncated coordinate information to locate the UE 310. The truncated coordinate information may be smaller than other types of location information used in other location techniques, so use of the truncated coordinate information may reduce the size of the message used to report location information for the UE 310 or may free up bits in the message for other information, among other advantages.

Alternative examples of the following may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

The process flow 300 may be described in the context of geographic coordinates (also referred to as location coordinates, position coordinates, and the like) that represent the geographic location of an object. For example, the process flow 300 may be described with reference to GNSS coordinates, such as Global Positioning System (GPS) coordinates. GPS coordinates may include two decimal numbers that respectively represent the longitude and latitude of an object. Thus, each GPS coordinate may be made up of a set of digits, and collectively the GPS coordinates of an object may be used to locate that object with a threshold precision (e.g., within several meters). Although GPS coordinates are provided as an example, the techniques described herein can be implemented using other coordinate systems.

At 315, the base station 305 may determine a quantity of geographic coordinate digits that the UE 310 should report to the base station 305 (or a quantity of least-significant geographic digits that that the UE 310 should drop). The quantity of geographic coordinate digits may represent a subset of the geographic coordinate digits that define the location of the UE 310. For example, the base station 305 may determine that the UE 310 should drop the last x digits from the geographic coordinates of the UE 310 because those x digits provide a level of unnecessary precision. So, in some examples, the base station 305 may determine the quantity of coordinate digits based on the precision desired (e.g., r kilometers) for a beam management procedure (or other type of procedure that is based on the location of the UE 310). Additionally or alternatively, the base station 305 may determine the quantity of bits based on the size and/or shape of the beam footprint covering the UE 310.

At 320, the base station 305 may transmit, and the UE 310 may receive, an indication of the quantity of geographic coordinate digits. The indication may be included in a request for the coordinate digits. In some examples, the indication is included in a system information block (SIB) broadcast by the base station 305. In some examples, the indication is included in an RRC message. In some examples, the indication is included in a downlink control information (DCI) message. In some examples, the base station 305 may transmit an indication of a metric (e.g., a precision threshold) associated with the quantity of geographic coordinate digits in addition to or instead of the indication of the quantity.

At 325, the UE 310 may determine the geographic coordinates of the UE 310. For example, the UE 310 may determine a latitudinal coordinate (e.g., 33.127364) and a longitudinal coordinate (e.g., −117.310593). The UE 310 may determine the geographic coordinates based on the request received at 320. At 330, the UE 310 may transmit to the base station 305 a truncated (e.g., shortened) version of the geographic coordinates based on the quantity of coordinate digits indicated at 320. For example, the UE 310 may transmit a subset of the digits that make up each geographic coordinate. Continuing the aforementioned illustration, the UE 310 may transmit geographic coordinates (33.127, −117.310) instead of geographic coordinates (33.127364, −117.310593). Thus, the location information transmitted by the UE 310 may be condensed relative to other techniques that use the full set of geographic coordinate digits. The location information (e.g., the truncated geographic coordinates) may be transmitted during a random access procedure or after successful completion of a random access procedure.

At 335, the base station 305 may determine the location of the UE 310 based on the truncated versions of the geographic coordinates received at 330. As noted, the location determined by the base station 305 may be an approximate location (e.g., on the order of hundreds of meters) that supports a beam management procedure.

Thus, the base station 305 may use truncated coordinate information to locate the UE 310. Various aspects of process flow 300 and Technique 3 may be combined with one or more of the other techniques described herein.

Figure 4:
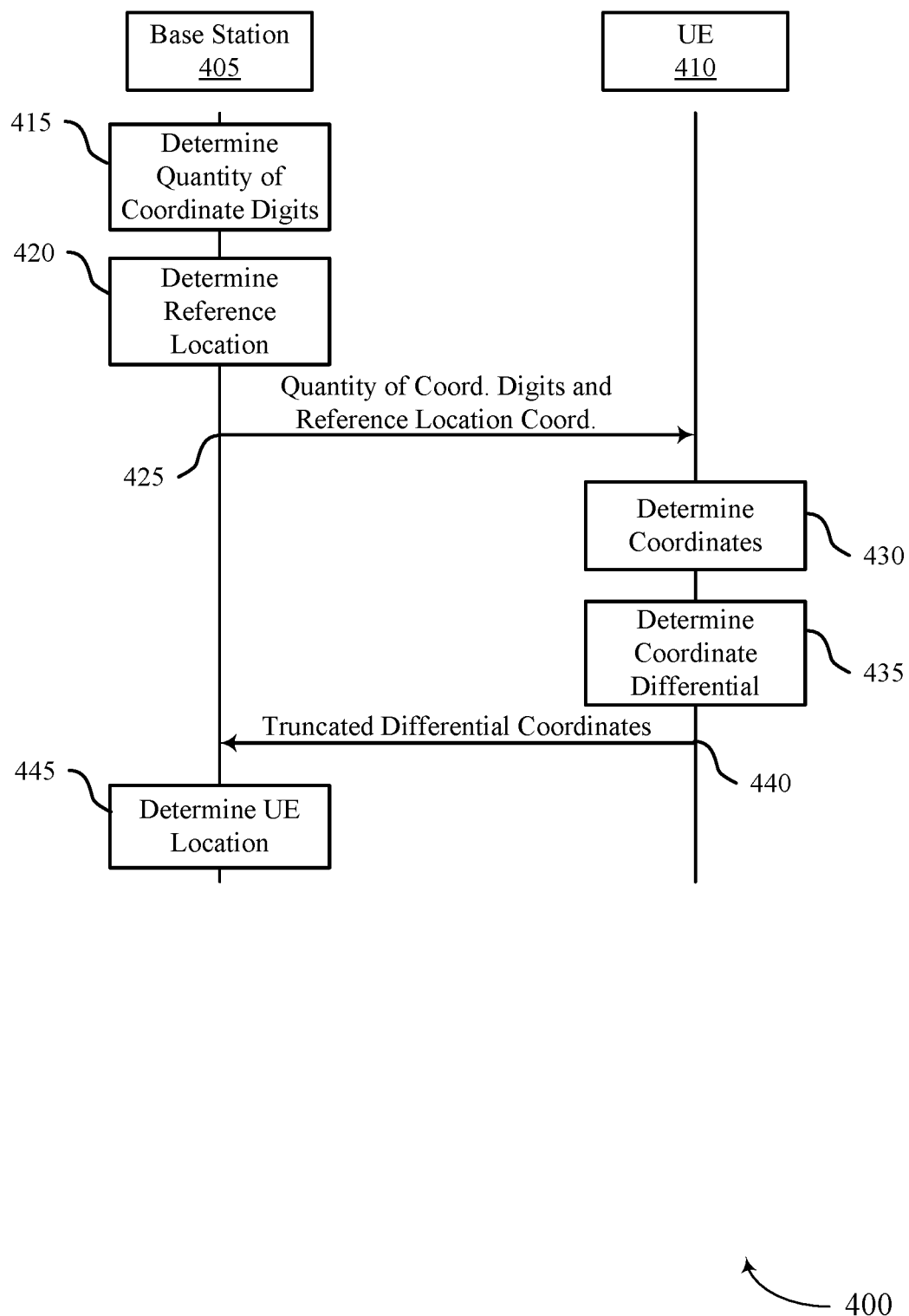
FIG. 4 illustrates an example of a process flow that supports location reporting for a UE in accordance with aspects of the present disclosure.

FIG. 4 illustrates an example of a process flow 400 that supports location reporting for a UE in accordance with aspects of the present disclosure. In some examples, process flow 400 may implement aspects of wireless communications system 100 or 200. For example, process flow 400 may be implemented by a base station 405 and a UE 410, which may be examples of a base station (terrestrial or non-terrestrial) or a UE as described herein.

Process flow 400 may represent aspects of Technique 4 and thus may support the base station 405 using differential coordinate information to locate the UE 410. The differential coordinate information may be smaller than other types of location information used in other location techniques, so use of the differential coordinate information may reduce the size of the message used to report location information for the UE 410 or may free up bits in the message for other information, among other advantages. If truncated, the differential coordinate information may be smaller than the truncated coordinate information described with respect to Technique 3. However, Technique 3 may consume fewer processing resources (relative to Technique 4) at the UE and base station.

Alternative examples of the following may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

At 415, the base station 405 may determine a quantity of geographic coordinate digits that the UE 410 should report to the base station 405 (or that that the UE 410 should drop). The quantity of geographic coordinate digits may represent a subset of the geographic coordinate digits that define the location of the UE 410. For example, the base station 405 may determine that the UE 410 should drop the last x digits from the geographic coordinates of the UE 410 because those x digits provide a level of unnecessary precision. So, in some examples, the base station 405 may determine the quantity of coordinate digits based on the precision desired for a beam management procedure (or other type of procedure that is based on the location of the UE 410). Additionally or alternatively, the base station 405 may determine the quantity of bits based on the size and/or shape of the beam footprint covering the UE 410.

At 420, the base station 405 may determine a reference location (also referred to as a reference point or other suitable terminology) for a location procedure with the UE 410. In some examples, the reference location may be at the center of the beam footprint covering the UE 410 (e.g., the reference location may be at the center of the coverage area of the transmission beam serving the UE 410). In some examples, the reference location is at a point other than the center of the beam footprint. At 425, the base station 405 may transmit an indication of the quantity of geographic coordinate digits. The indication may be included in a request for the coordinate digits. In some examples, the indication is included in a SIB, RRC message, or DCI message. The base station 405 may also transmit the geographic coordinates of the reference location. The base station 405 may transmit the quantity of geographic coordinate digits and the reference point geographic coordinates concurrently or at different times, in the same message or in different messages.

At 430, the UE 410 may determine the geographic coordinates of the UE 410. The UE 410 may determine the geographic coordinates based on the request received at 420. At 435, the UE 410 may determine coordinate differentials based on the geographic coordinates of the UE 410 and the geographic coordinates of the reference location. A coordinate differential may be the difference between the geographic coordinates of the reference location and the geographic coordinates of the UE 410. Thus, the coordinate differentials may indicate the location of the UE 410 relative to the reference location. As an example, if the UE 410 is located at (33.127364, −117.310593) and the reference location is located at (32.896775, −117.201768), the UE 410 may determine differential coordinates equal to (0.230589, −0.108825).

Similar to Technique 3, the UE 410 may also determine how many digits to transmit per coordinate differential. For example, the 410 may determine to transmit a subset of the digits per coordinate differential based on the quantity of digits indicated by the base station 405. Continuing the aforementioned illustration, the UE 410 may transmit (0.230, −0.108) instead of (0.230589, −0.108825), thus saving bits. The location information (e.g., the coordinate differentials) may be transmitted during a random access procedure or after successful completion of a random access procedure.

At 440, the UE 410 may transmit the truncated versions of the differential coordinates to the base station 405. At 445, the base station 405 may determine the location of the UE 410 based on the truncated versions of the differential coordinates and the reference location.

Thus, the base station 405 may use differential coordinate information to locate the UE 410. Various aspects of process flow 400 and Technique 4 may be combined with one or more of the other techniques described herein.

Figure 5:
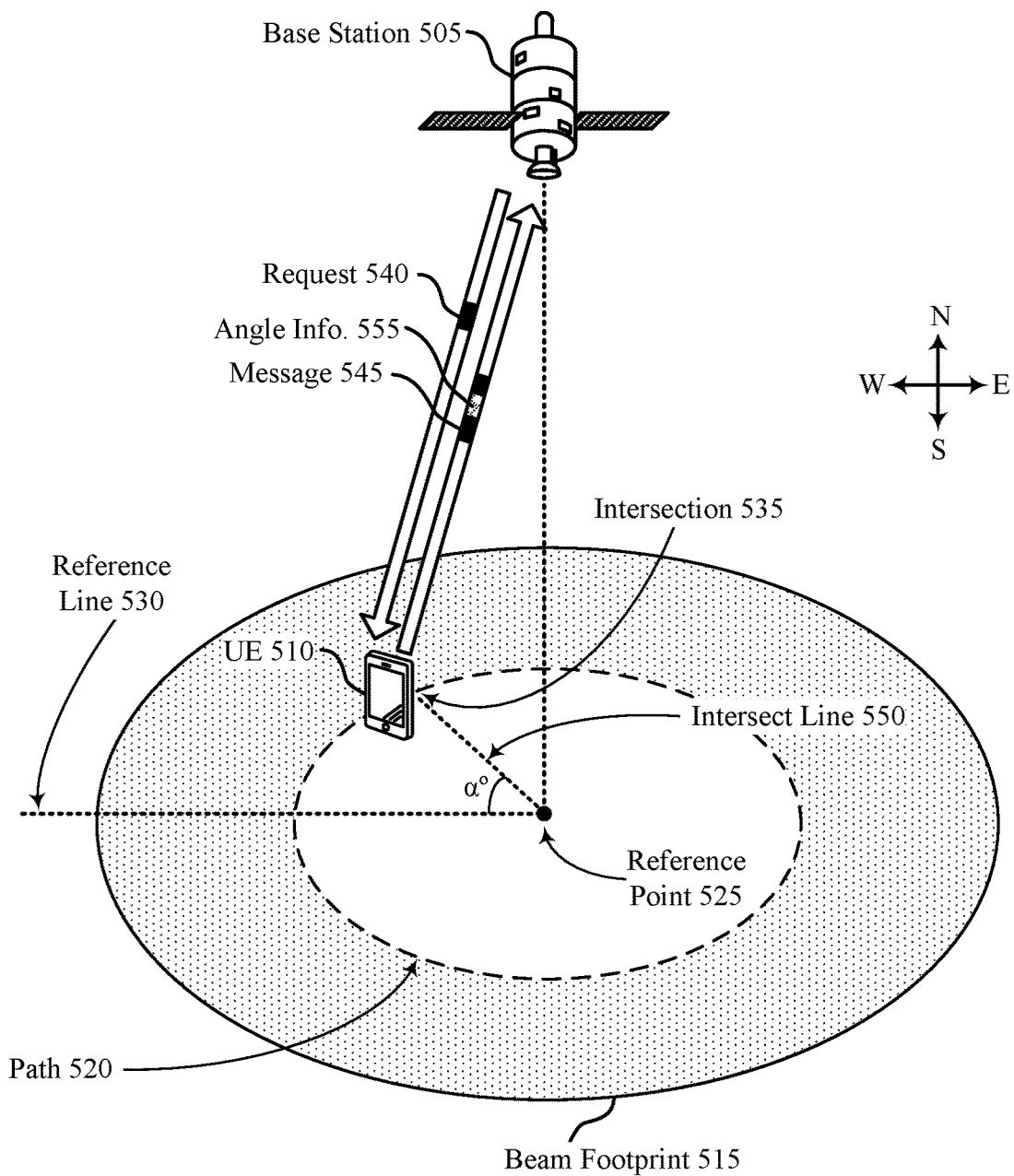
FIG. 5 illustrates an example of a wireless communications system that supports location reporting for a UE in accordance with aspects of the present disclosure.

FIG. 5 illustrates an example of a wireless communications system 500 that supports location reporting for a UE in accordance with aspects of the present disclosure. In some examples, wireless communications system 500 may implement aspects of wireless communications system 100 or 200. For example, wireless communications system 500 may include a base station 505 and a UE 510, which may be examples of a base station (terrestrial or non-terrestrial) or a UE as described herein. The wireless communications system 500 may support aspects of Technique 5 and thus may support the base station 505 using angle information to locate the UE 510. The angle information may be smaller than other types of location information used in other location techniques, so reporting the angle information may reduce the size of the message used to report the angle information or free up bits in the message for other information, among other advantages.

The base station 505 may provide connectivity to the UE 510 using a transmission beam with beam footprint 515, which may also be referred to as the coverage area of the transmission beam or the beam coverage area. As described in more detail below, the base station 505 may determine the location of the UE 510 by 1) using the propagation delay between the UE 510 and the base station 505 to determine a path along which the UE 510 is located, and 2) using an angle of the UE 510 relative to a reference line to determine a point along the path where the UE 510 is located (e.g., the intersection of the angle and the path may give the location of the UE 510). These operations may be performed concurrently, at different times, or in a different order than that described.

As noted, the base station 505 may determine a path along which the UE 510 is located. To do so, the base station 505 may determine the distance between the UE 510 and the base station 505 and use that distance to map out some or all the points on the Earth's surface that correspond to that distance. For example, the base station 505 may use the distance to determine path 520, which may represent the intersection of Earth's surface with a sphere whose size is based on the distance between the UE 510 and the base station 505 (e.g., the radius of the sphere may be equal to the distance). Because the distance between the base station 505 and each point along path 520 is equal to the distance between the UE 510 and the base station 505, the base station 505 may know that there is a high likelihood that the UE 510 is located somewhere along the path 520.

As illustrated, when the base station 505 is positioned directly above the center of beam footprint 515 (e.g., when the base station's elevation angle is 90°), the path of possible locations for the UE 215 (e.g., path 520) may be the perimeter of a circle or ellipse. When the elevation angle of the base station 505 is less than 90°, the path of possible locations for the UE 510 may be an arc that at least partially traverses the beam footprint 515.

The base station 505 may determine the distance between the UE 510 and the base station 505 (and thus the path 520) based on the propagation delay between the UE 510 and the base station 505. The base station 505 may determine the propagation delay based on a message received from the UE 510. For example, the base station 505 may determine the propagation delay based on a random access message (e.g., sent over the physical random access channel (PRACH)) during a random access procedure.

In addition to determining the path 520, the base station 505 may also determine the angle of the UE 510 relative to a reference line (or reference ray). The UE 510 may report the angle of the UE 510 in a message 545 (e.g., the UE 510 may transmit an indication of the angle so that the message 545 includes angle information 555). The UE 510 may report the angle to the base station 505 autonomously or in response to a request for the angle (e.g., request 540) transmitted by the base station 505. In some examples, the request 540 may be included in a SIB broadcast by the base station 505. In some examples, the message 545 be a message for a random access procedure. For example, the message 545 may be Message A or Message 3 in a two-step random access procedure. Or the message 545 may be Message 5 of a four-step random access procedure. Thus, angle information 555 may be transmitted during a random access procedure or after successful completion of a random access procedure.

The UE 510 may determine the angle based on a reference point 525 and a reference line 530 (or a reference "ray") that intersects the reference point 525. For example, the UE 510 may determine that the UE 510 is at an angle α° relative to the reference line 530. The base station 505 may provide to the UE 510 the geographic coordinates or some other indication of the reference point 525, which may move based on the movement of the base station 505 or the movement of the Earth. The base station 505 select the center of the beam footprint 515 or a different location in beam footprint 515 as the location of the reference point 525. The base station 505 may also provide to the UE 510 the orientation of the reference line 530 or some other indication of the relationship between the reference line 530 and the reference point 525. Alternatively, the UE 510 may autonomously determine the orientation of the reference line 530 (e.g., the orientation of the refence line may preconfigured or programmed at the UE 510).

As noted, the base station 505 may use the path 520 and the angle α° to determine the location of the UE 510. For example, the base station 505 may determine that the UE 510 is located at intersection 535, which is the intersection of the path 520 and a line (e.g., intersect line 550, which may also be referred to an intersect ray) that intersects the reference point 525 at angle α°. Thus, the base station 505 may determine the location of UE 510 based on angle information reported by the UE 510.

Although described with reference to angle information, in some examples, the base station 505 may determine the location of the UE 510 based on other directional information relative to the reference point 525 or the reference line 530. For example, rather than transmitting an indication of the angle in message 545, the UE 510 may transmit an indication of a direction (e.g., a cardinal direction) of the UE 510 relative to the reference point 525 or the reference line 530. For example, the UE 510 may report that the UE 510 is North-West of the reference point 525 or the North of the reference line 530.

Various aspects of the wireless communications system 500 and Technique 5 may be combined with one or more of the other techniques described herein.

Figure 6:
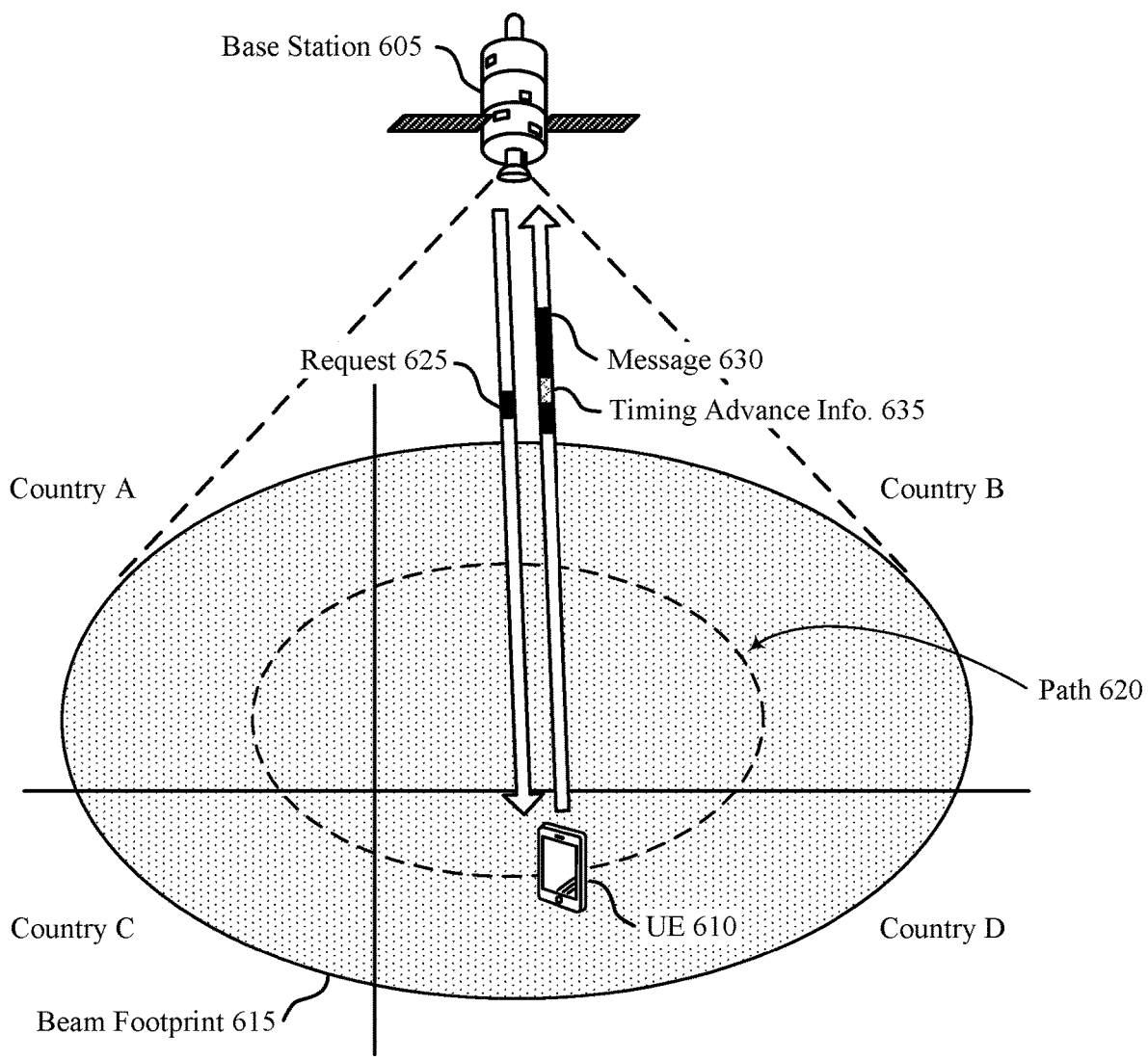
FIG. 6 illustrates an example of a wireless communications system that supports location reporting for a UE in accordance with aspects of the present disclosure.

FIG. 6 illustrates an example of a wireless communications system 600 that supports location reporting for a UE in accordance with aspects of the present disclosure. In some examples, wireless communications system 600 may implement aspects of wireless communications system 100 or 200. For example, wireless communications system 600 may include a base station 605 and a UE 610, which may be examples of a base station (terrestrial or non-terrestrial) or a UE as described herein.

The wireless communications system 600 may support aspects of Technique 1 and thus may support the base station 605 using timing advance information to locate the UE 610. Use of the timing advance information may allow the base station 605 to determine the location of the UE 610 before an RRC connection is established with the UE 610, which may be useful for selecting an appropriate core network for the UE 610, among other reasons. Use of the timing advance information may also allow the base station 605 to preserve the privacy of the UE 610 if the location procedure is performed before secure messaging is setup (e.g., during a random access procedure, which may involve unsecured messages).

The base station 605 may provide connectivity to the UE 610 using a transmission beam with beam footprint 615, which may span portions of multiple countries (e.g., Country A, Country B, Country C, and Country D). As described in more detail below, the base station 605 may determine the country of the UE 610 (e.g., Country D) by 1) using the timing advance for UE 610 to determine a path along which the UE 610 is located, and 2) using additional techniques to determine a point or region along the path where the UE 610 is located. These operations may be performed concurrently, at different times, or in a different order than that described.

The base station 605 may determine a path along which the UE 610 is located. For example, the base station 605 may determine the path 620 based on the distance between the UE 610 and the base station 605 (e.g., as described with reference to FIG. 5), which in turn may be based on the timing advance (e.g., propagation delay) for the UE 610. The UE 610 may transmit an indication of the timing advance in message 630. Thus, the message 630 may include timing advance information 635. In some examples, the message 630 may be a random access message that is transmitted during a random access procedure with the base station 605. For example, the message 630 may be Message A or Message 3 in a two-step random access procedure. Or the message 630 may be Message 5 of a four-step random access procedure. Thus, the message 630 may be transmitted by the UE 610 before an RRC connection is established with the base station 605.

The UE 610 may determine the timing advance based on one or more messages from the base station 605. For example, the UE 610 may determine the timing advance based on one or more random access messages received by the UE 610 during a random access procedure with the base station 605. The UE 610 may determine the timing advance in response to a request (e.g., request 625) received from the base station 605. The request 625 may be included in a random access message during a random access procedure or in a different type of message at a different time. For example, the request 625 may be included in Message 2 or Message 4 of the random access procedure. As another example, the request 625 may be included in a SIB. In some examples, the base station 605 may transmit the request 625 based on determining that the footprint 615 spans multiple countries or portions of multiple countries.

In some examples, the base station 605 may determine the timing advance (or propagation delay) based on a timing difference reported by the UE 610. For example, the UE 610 may determine, and report, a difference between a reception timing for a downlink transmission from the base station 605 (e.g., Message 4) and a transmission timing for an uplink transmission (e.g., Message 5) to the base station 605. In such a scenario, the base station 605 may determine the timing advance as the total time taken by the uplink transmission and the downlink transmission minus the reported timing difference.

The base station 605 may use one or more techniques to determine a location of the UE 610 along the path 620. Alternatively, the base station 605 may use one or more of the following techniques to locate the UE 610 independent of the path 620 (e.g., the base station 605 may locate the UE 610 without determining the path 620).

In a first example, the base station 605 may determine the approximate location of the UE 610 (in general or along the path 620) by locating the cell closest to the UE 610. To do so, the base station 605 may ask the UE 610 to report the identifier (ID) of the cell with the highest quality or the strongest signaling (as determined by the UE 610) relative to other cells. Upon determining the ID of the cell with the highest quality or strongest signaling, the UE 610 may transmit an indication of the ID to the base station 605. The indication of the ID may be transmitted in the same message as the timing advance (e.g., in message 630) or in a different message. Using signal strength as a proxy for proximity, the base station 605 may use the location of the cell associated with the reported cell ID to determine a likely area of the UE 610 or a section of the path 620 along which the UE 610 is likely located.

In a second example, the base station 605 may determine the approximate location of the UE 610 (in general or along the path 620) by locating cells close to the UE 610. To do so, the base station 605 may ask the UE 610 to report the ID of nearby cells (e.g., cells associated with signaling strengths that satisfy a threshold strength). Upon determining the IDs of nearby cells, the UE 610 may transmit an indication of the IDs to the base station 605. The indication of the IDs may be transmitted in the same message as the timing advance (e.g., in message 630) or in a different message. The base station 605 may use the location of the cells associated with the reported cell IDs to determine a likely area of the UE 610 or a section of the path 620 along which the UE 610 is likely located.

In a third example, the base station 605 may determine the approximate location of the UE 610 along the path 620 by determining another path for the UE 610. To do so, the base station 605 may ask the UE 610 to report a second timing advance that is between the UE 610 and another base station. The UE 610 may determine the second timing advance for the other base station based on the request and transmit an indication of the second timing advance to the base station 605. The indication of the second timing advance may be transmitted in the same message as the timing advance (e.g., in message 630) or in a different message. The base station 605 may use the second timing advance to determine a second path for the UE 610 (e.g., using a process similar to the process described with reference to FIG. 5, but with respect to the second base station). If the second path intersects with the first path, the base station 605 may determine that the UE 610 is located at one of the intersecting points.

In a fourth example, the base station 605 may determine the approximate location of the UE 610 (e.g., in general or along the path 620) by determining a position of the UE 610 relative to one or more reference locations or reference lines. To do so, the base station 605 may request that the UE 610 provide an indication of the UE's position relative to the one or more reference locations or reference lines, which may be provided to (e.g., broadcast) the UE 610 by the base station 605. Accordingly, the UE 610 may determine the position of the UE 610 relative to the reference location(s) or reference line(s) and transmit an indication of the position to the base station 605. For example, the UE 610 may indicate a direction (e.g., North, South, East, West, etc.) relative to the reference location or reference line, an angle between the reference line and a vector associated with the UE 610, or both. Additionally or alternatively, the UE 610 may indicate whether the UE 610 is to the right or left of the reference location or reference line, whether the UE is above or below the reference location or reference line, or both, among other combinations and possibilities. Thus, the UE 610 may indicate a relative position of the UE 610 to a reference location or a reference line, and the base station 605 may use the relative position of the UE 610 to determine a likely area of the UE 610 or an approximate location of the UE 610 along the path 620.

Although described with respect to a single reference location or a single reference line, the techniques described herein may be implemented with respect to any quantity of reference locations and any quantity of reference lines. A reference location may also be referred to as a reference point or other suitable terminology, and a reference line may also be referred to as a reference ray, a reference vector, or other suitable terminology. Information that indicates a position of the UE 610 relative to a reference location or a reference line may be referred to as relative position information.

A reference location may be at the center of a beam footprint (e.g., the center of beam footprint 615), at the border of one or more tracking areas or countries, or along a border line (e.g., a country border line), among other possibilities. As noted, the base station 605 may indicate one or more reference locations to the UE 610 via one or more broadcasts and the UE 610 may report relative position information associated with the reference location(s)/line(s). The base station 605 may request the relative position information from the UE 610 or the UE 610 may communicate the relative position information independent of a request from the base station 605.

In some examples, the UE 610 may map a position (e.g., the relative position) of the UE 610 to a tracking area code (TAC). In such a scenario, the UE 610 may report the TAC, which may indicate the position of the UE 610. Thus, the UE 610 may be configured with a mapping function that allows the UE 610 to map the position of the UE 610 to TACs. For example, if the UE 610 is South and West of a reference location, the UE 610 may map that direction to TAC1 and indicate the position of the UE 610 by reporting TAC1 to the base station 605. In such a scenario, the base station 605 may determine the approximate location of the UE 610 based on the TAC (e.g., TAC1) reported by the UE 610.

In some examples, the UE 610 may determine zone identifiers (zone IDs) for zones of the Earth. In some examples, the UE 610 may determine a mapping between zone identifiers and TACs (or the position of the UE 610 or the relative position of the UE 610) so that the UE 610 can indication the location of the UE 610 by reporting the corresponding zone ID. For example, the UE 610 may determine that zone IDs 1 through x belong to TAC 1, that zone IDs x+1 through y belong to TAC 2, and so on and so forth. So, if the UE 610 is in zone ID 1, the UE 610 may report TAC 1 (e.g., the TAC to which zone ID 1 belongs). In such a scenario, the base station 605 may determine the approximate location of the UE 610 based on the TAC (e.g., TAC1) reported by the UE 610. Additionally or alternatively, the UE 610 may report the zone ID. For example, the UE 610 may determine the zone ID for the zone in which the UE 610 is positioned and may report that zone ID to the base station 605. In another example, the UE 610 may determine the TAC in which the UE 610 is located and may report one or more of the zone IDs associated with that TAC. The UE 610 may determine the zone ID, TAC, or both, based on the relative position of the UE 610 with respect to a reference point indicated by the base station 605.

In a fifth example, the base station 605 may determine the approximate location of the UE 610 (e.g., in general or along the path 620) by determining an angle of arrival for a reference signal received from the UE 610. To do so, the base station 605 may ask the UE 610 to periodically transmit a reference signal and the UE 610 may comply. The base station 605 may then monitor (e.g., scan) for the reference signals from the UE 610 with a spare directional antenna (e.g., an antenna not used to provide beam footprint 615). If the base station 605 receives one of the reference signals from the UE 610, the base station 605 may determine the location of the UE 610 based on the location of the beam footprint of the directional antenna used to receive the reference signal.

Thus, the base station 605 may use a timing advance and/or additional location techniques to determine the location of the UE 610. Upon determining the location (or approximate location) of the UE 610, the base station 605 may determine the country of the UE 610 so that the base station 605 can connect to the appropriate core network (e.g., the core network belonging the country in which the UE 610 is located). Although described with reference to Technique 1, the base station 605 may determine the country of the UE 610 using aspects of other technique described herein, such as Technique 1, Technique 2, and Technique 3. However, for each of these techniques the UE 610 may reduce the precision of the location information provided to the base station 605 to preserve the privacy of the UE 610 (e.g., if the location information is included in an unsecured message, such as a random access message).

Various aspects of the wireless communications system 600 and Technique 1 may be combined with one or more of the other techniques described herein.

Figure 7:
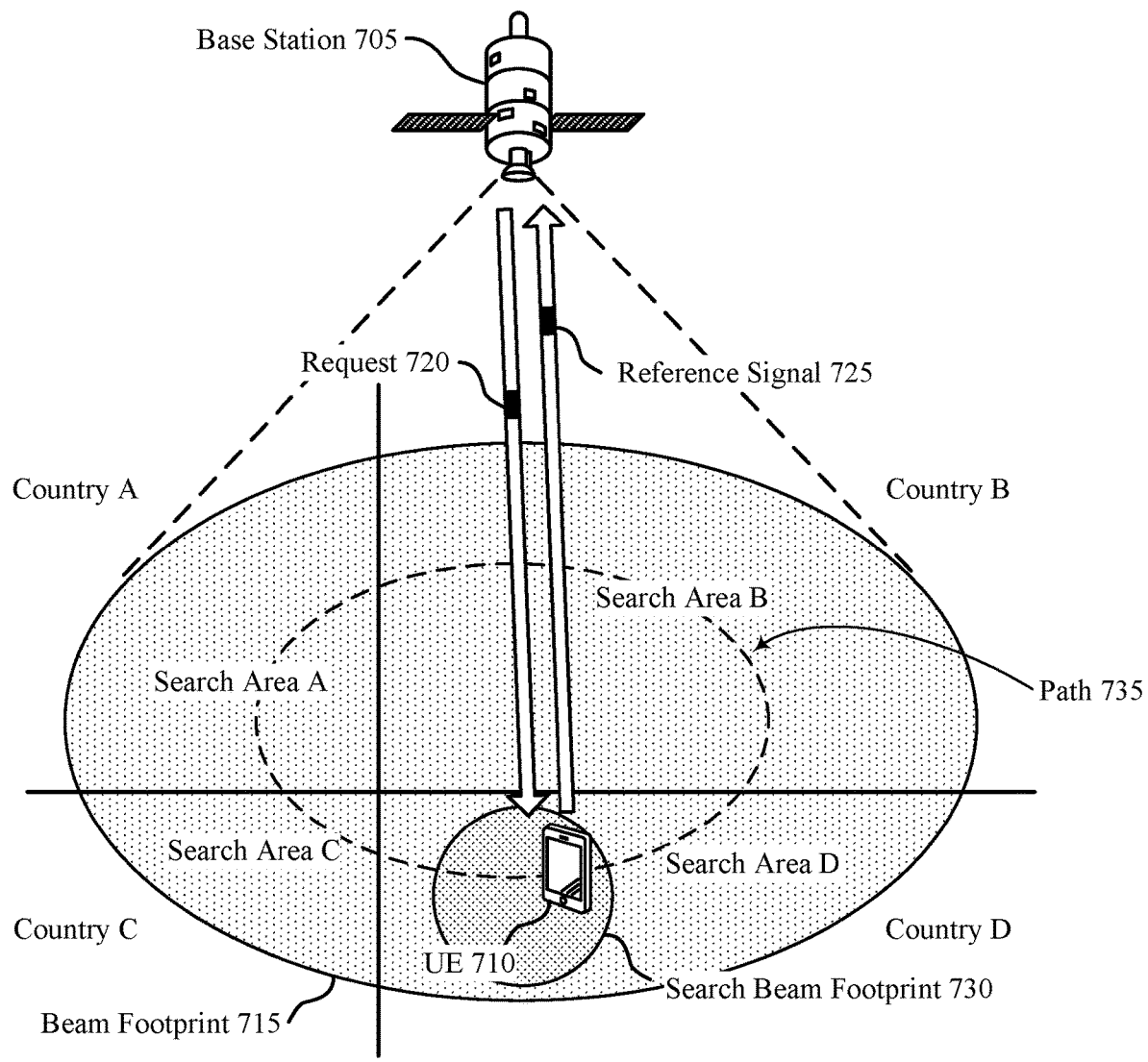
FIG. 7 illustrates an example of a wireless communications system that supports location reporting for a UE in accordance with aspects of the present disclosure.

FIG. 7 illustrates an example of a wireless communications system 700 that supports location reporting for a UE in accordance with aspects of the present disclosure. In some examples, wireless communications system 700 may implement aspects of wireless communications system 100 or 200. For example, wireless communications system 700 may include a base station 705 and a UE 710, which may be examples of a base station (terrestrial or non-terrestrial) or a UE as described herein.

The wireless communications system 700 may support aspects of Technique 2 and thus may support the base station 705 using uplink reference signals to locate the UE 710. Use of the reference signals may allow the base station 705 to determine the location of the UE 710 before an RRC connection is established with the UE 710, which may be useful for selecting an appropriate core network for the UE 710, among other reasons. Use of the reference signal may also allow the base station 705 to preserve the privacy of the UE 710 if the location procedure is performed before secure messaging is setup (e.g., during a random access procedure).

The base station 705 may provide connectivity to the UE 710 using a transmission beam with beam footprint 715, which may span portions of multiple countries (e.g., Country A, Country B, Country C, and Country D). As described in more detail below, the base station 705 may determine the country of the UE 710 (e.g., Country D) by monitoring for uplink reference signals transmitted by the UE 710.

The base station 705 may prompt the UE 710 to transmit reference signals by transmitting request 720. Request 720 may indicate a periodicity with which the UE 710 is to transmit the reference signal, a duration of time for which the UE 710 is to transmit the reference signal, or a quantity of times the UE 710 is to transmit the reference signal. In some examples, the request 720 may be included in a random access message. For example, the request 720 may be included in Message 2 or Message 4 of the random access procedure. Thus, the request 720 may be communicated during a random access procedure between the base station 705 and the UE 710. Alternatively, the request 720 may be communicated after successful completion of a random access procedure. In some examples, the base station 705 may transmit the request 720 based on determining that the footprint 715 spans multiple countries or portions of multiple countries.

The UE 710 may transmit the reference signal 725 based on request 720. The reference signal may be specific to the UE 710 so that the base station 705 can distinguish between reference signals from multiple UEs. In some examples, the UE 710 may transmit the reference signal during a random access procedure with the base station 705. The UE 710 may periodically transmit the reference signal the quantity of times indicated by the base station 705, for the duration of time indicated by the base station 705, or until the base station 705 instructs the UE 710 to stop transmitting the reference signal.

After sending the request 720, the base station 705 may monitor for the reference signal 725 from the UE 710. Monitoring for the reference signal may include tuning the receiver of the base station 705 to a frequency band over which the reference signal is expected and configuring one or more directional antennas of the base station 705 to detect signals that originate from certain areas of the beam footprint 715. For example, the base station 705 may use one or more antennas with search beam footprint 730 to monitor search area A, search area B, and search area D, which may be portions of countries that are unaffiliated with the base station 705. In another example, the base station 705 may monitor search area B, which may be a portion of the country affiliated with the base station 705. If the search beam footprint 730 is smaller than the area to be searched, the base station 705 may move or sweep the search beam footprint to cover the area. In some examples, the base station 705 may reduce the size of the area to be searched by determining path 735, as described with reference to FIGS. 5 and 6. Thus, the base station 705 may limit the monitoring to areas along the path 735, which may be more efficient.

The base station 705 may determine the location of the UE 710 based on the reception status of the reference signal. For example, if the base station 705 receives a reference signal while monitoring a search area, the base station 705 may determine that the UE 710 is located in that search area. If the base station 705 does not receive a reference signal while monitoring a search area, the base station 705 may determine that the UE 710 is located in the unmonitored area of the beam footprint 715. Locating the UE 710 within an area or region of the beam footprint 715 may allow the base station 705 to determine the country of the UE 710, which in turn may enable the base station 705 to connect to the appropriate core network (e.g., the core network for that country). In some examples, the base station 705 may further refine the location of the UE 710 based on the location covered by the search beam footprint 730 when the reference signal was received.

Thus, the base station 705 may use uplink reference signals to determine the location of the UE 710. Various aspects of the wireless communications system 700 and Technique 2 may be combined with one or more of the other techniques described herein.

Figure 8:
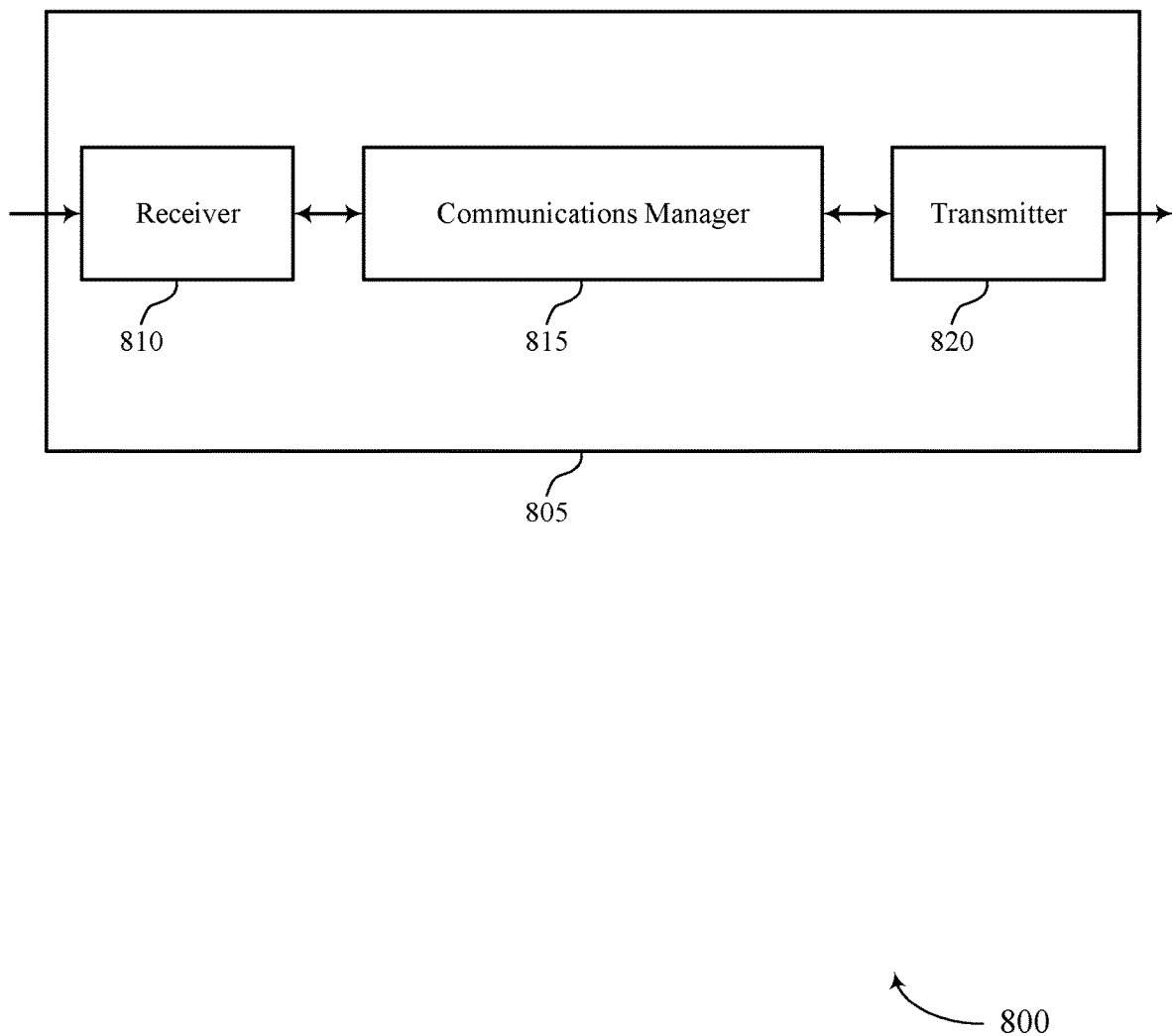
FIGS. 8 and 9 show block diagrams of devices that support location reporting for a UE in accordance with aspects of the present disclosure.

FIG. 8 shows a block diagram 800 of a device 805 that supports location reporting for a UE in accordance with aspects of the present disclosure. The device 805 may be an example of aspects of a UE 115 as described herein. The device 805 may include a receiver 810, a communications manager 815 (which may be an example of a processing system), and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to location reporting for a UE, etc.). Information may be passed on to other components of the device 805. The receiver 810 may be an example of aspects of the transceiver 1120 described with reference to FIG. 11. The receiver 810 may utilize a single antenna or a set of antennas.

In some examples, the communications manager 815 may obtain (e.g., via receiver 810), a request from a base station for the UE to report condensed location information of the UE to the base station, the condensed location information including fewer bits than information associated with a full global navigation satellite system coordinate of the UE, determine a location of the UE based on obtaining the request, and output (e.g., to transmitter 820) the condensed location information for transmission to the base station based on the determination of the location of the UE and the request.

In some examples, the communications manager 815 may obtain (e.g., via receiver 810) from a base station a request for the UE to report location information, determine the location information based on the request, and output (e.g., to the transmitter 820) the location information for transmission to the base station during a random access procedure or after the random access procedure is successfully completed.

In some examples, the communications manager 815 may obtain (e.g., via receiver 810), from a base station during a random access procedure, a request for the UE to report a timing advance between the UE and the base station, determine the timing advance between the UE and the base station based at least in part on the request, and output (e.g., to transmitter 820) an indication of the timing advance for transmission to the base station during the random access procedure.

In some examples, the communications manager 815 may obtain (e.g., via receiver 810), from a base station before a radio resource control connection is established with the UE, a request for the UE to transmit a reference signal for identifying a location of the UE and output (e.g., to transmitter 820) the reference signal for transmission based on the request received from the base station, where the reference signal is outputted before or after the radio resource control connection is established. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
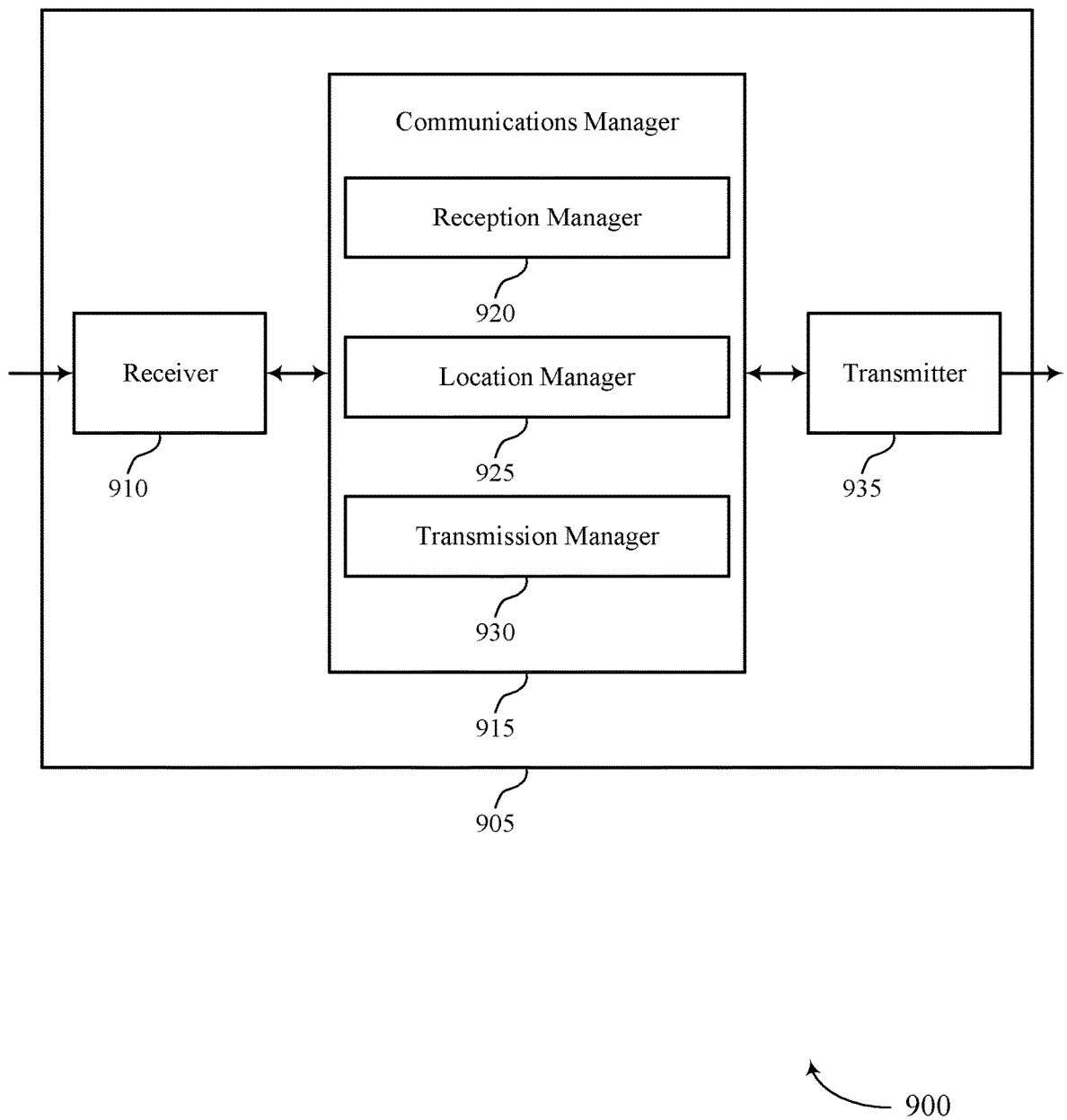

FIG. 9 shows a block diagram 900 of a device 905 that supports location reporting for a UE in accordance with aspects of the present disclosure. The device 905 may be an example of aspects of a device 805, or a UE 115 as described herein. The device 905 may include a receiver 910, a communications manager 915 (which may be an example of a processing system), and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to location reporting for a UE, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a reception manager 920, a location manager 925, and a transmission manager 930. The communications manager 915 may be an example of aspects of the communications manager 1110 described herein.

The reception manager 920 may obtain (e.g., via receiver 910) a request from a base station for the UE to report condensed location information of the UE to the base station, the condensed location information including fewer bits than information associated with a full global navigation satellite system coordinate of the UE.

The location manager 925 may determine a location of the UE based on obtaining the request. The transmission manager 930 may output (e.g., to transmitter 935) the condensed location information for transmission to the base station based on the determination of the location of the UE and the request.

The reception manager 920 may obtain (e.g., via receiver 910) a request from a base station for the UE to report location information. The location manager 925 may determine the location information based on the request.

The transmission manager 930 may output (e.g., to transmitter 935) the location information for transmission to the base station during a random access procedure or after the random access procedure is successfully completed.

The reception manager 920 may obtain (e.g., via receiver 910), from a base station before a radio resource control connection is established with the UE, a request for the UE to transmit a reference signal for identifying a location of the UE.

The transmission manager 930 may output (e.g., to transmitter 935) the reference signal for transmission based on the request obtained from the base station, where the reference signal is outputted before or after the radio resource control connection is established.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
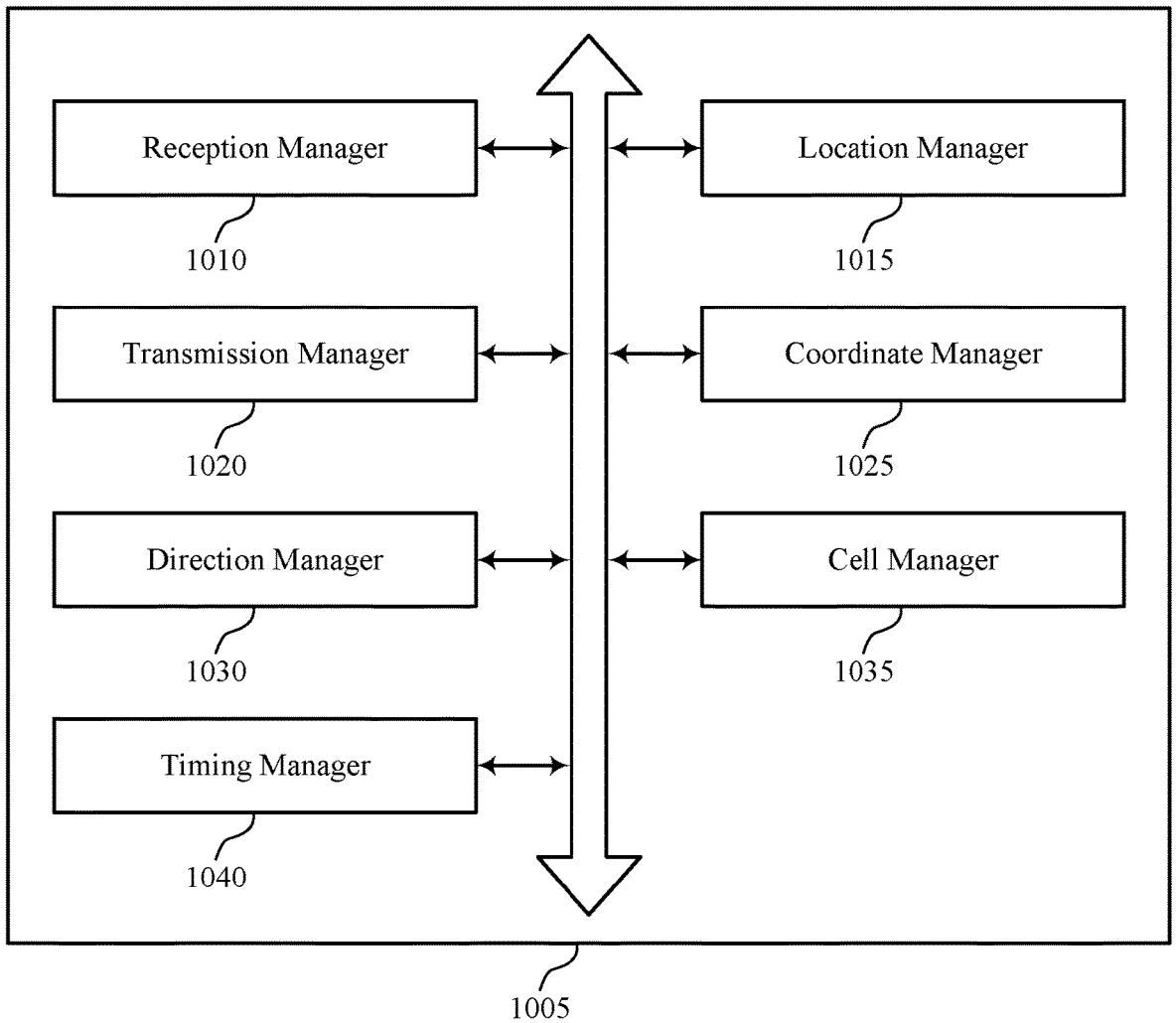
FIG. 10 shows a block diagram of a communications manager that supports location reporting for a UE in accordance with aspects of the present disclosure.

FIG. 10 shows a block diagram 1000 of a communications manager 1005 that supports location reporting for a UE in accordance with aspects of the present disclosure. The communications manager 1005 may be an example of aspects of a communications manager 815, a communications manager 915, or a communications manager 1110 described herein. The communications manager 1005 may include a reception manager 1010, a location manager 1015, a transmission manager 1020, a coordinate manager 1025, a direction manager 1030, a cell manager 1035, and a timing manager 1040. Each of these modules may communicate, directly or indirectly, with one another (e.g., via one or more buses).

The reception manager 1010 may obtain, from a base station, a request for the UE to report condensed location information of the UE to the base station, the condensed location information including fewer bits than information associated with a full global navigation satellite system coordinate of the UE.

In some examples, the reception manager 1010 may obtain from a base station a request for the UE to report location information. In some examples, the reception manager 1010 may obtain, from a base station before a radio resource control connection is established with the UE, a request for the UE to transmit a reference signal for identifying a location of the UE.

In some examples, the reception manager 1010 may obtain the first geographic coordinate of the reference location from the base station, where determining the coordinate differential is based on obtaining the first geographic coordinate of the reference location. In some examples, the reception manager 1010 may obtain, from the base station, an indication of a reference location and an orientation of the reference ray associated with the reference location, where the reference ray is determined based on obtaining the indication of the reference location and the orientation.

In some examples, the reception manager 1010 may obtain, from the base station, an indication of a reference location. In some examples, the reception manager 1010 may obtain, from the base station during the random access procedure, a second indication to transmit a reference signal for identifying a location of the UE. In some examples, the reception manager 1010 may obtain from the base station an instruction to stop transmitting the reference signal. In some cases, the request is included in a SIB broadcast by the base station. In some cases, the request is included in Message 2 or Message 4 of a random access procedure.

The location manager 1015 may determine a location of the UE based on obtaining the request. In some examples, the location manager 1015 may determine the location information based on the request.

The transmission manager 1020 may output, for transmission to the base station, the condensed location information based on the determination of the location of the UE and the request. In some examples, the transmission manager 1020 may output for the location information for transmission to the base station during a random access procedure or after the random access procedure is successfully completed. In some examples, the transmission manager 1020 may output for transmission the reference signal based on the request obtained from the base station, where the reference signal is outputted before or after the radio resource control connection is established.

In some examples, the transmission manager 1020 may output the reference signal for transmission based on the indication. In some examples, the transmission manager 1020 may output the reference signal for transmission according to the periodicity indicated by the request. In some examples, the transmission manager 1020 may output the reference signal for transmission the quantity of times indicated by the request.

In some examples, the transmission manager 1020 may output the reference signal for transmission periodically for the duration of time. In some cases, the location information is transmitted during a random access procedure or after the random access procedure is successfully completed. In some cases, the random access procedure includes a four-step random access procedure and the location information is included in Message 5 of the four-step random access procedure. In some cases, the random access procedure includes a two-step random access procedure and the location information is included in Message A or Message 3 of the two-step random access procedure.

The coordinate manager 1025 may determine a geographic coordinate including a set of digits, where the request indicates a subset of digits of the set of digits and the condensed location information includes a truncated version of the geographic coordinate that is based on the subset of digits. In some examples, determining a coordinate differential including a difference between a first geographic coordinate of a reference location and a second geographic coordinate of the UE, where the request indicates the reference location and the condensed location information includes the coordinate differential. In some cases, the geographic coordinate represents a longitude of the UE or a latitude of the UE.

The direction manager 1030 may determine an angle associated with the location of the UE relative to a reference ray with a starting point at the reference location, where the request indicates the reference ray and the condensed location information includes the angle.

In some examples, the direction manager 1030 may determine, by the UE, an orientation of the reference ray associated with the reference location, where the reference ray is determined based on the reference location and the orientation.

In some examples, determining a direction of the UE relative to a center of a coverage area of a transmission beam of the base station, where the location information includes the direction. In some examples, determining an angle associated with the UE relative to a reference ray indicated by the base station, where the location information includes the angle.

The cell manager 1035 may determine a second cell associated with a strongest signal relative to cells other than the first cell, where the location information includes an identifier of the second cell. In some examples, determining a set of cells each associated with a respective signal strength that satisfies a threshold, where the location information includes identifiers of the set of cells.

The timing manager 1040 may determine a timing advance between the UE and the base station, where the location information includes an indication of the timing advance. In some examples, the timing manager 1040 may determine a second timing advance between the UE and a second base station. In some examples, the timing manager 1040 may output an indication of the second timing advance for transmission to the base station based on outputting the indication of the timing advance. In some examples, the timing manager 1040 may determine a timing advance between the UE and the base station based on receiving the request. In some examples, the timing manager 1040 may output an indication of the timing advance for transmission to the base station.

In some examples, the location manager 1015 may determine, based at least in part on location information for the UE, a position of the UE relative to a reference location indicated by the base station, where the location information indicates a direction of the apparatus with respect to the reference location. In some examples, the location manager 1015 may determine, based at least in part on location information for the UE, a tracking area code for a tracking area associated with a position of the UE relative to a reference location indicated by the base station, where the location information indicates the tracking area code. In some examples, the location manager 1015 may determine, based at least in part on location information for the UE, an identifier for a zone in which the UE is positioned, where the location information indicates the identifier for the zone.

Figure 11:
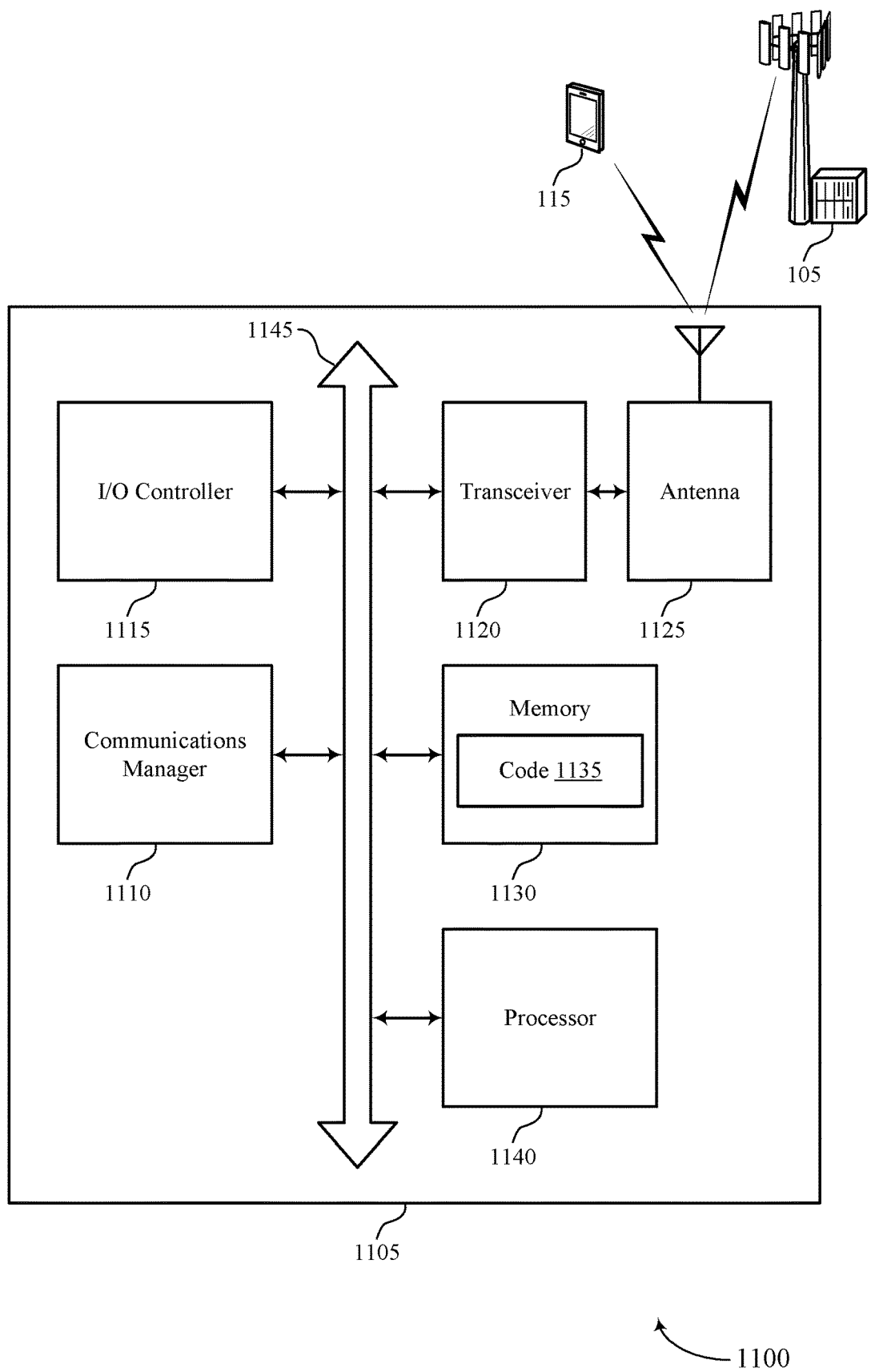
FIG. 11 shows a diagram of a system including a device that supports location reporting for a UE in accordance with aspects of the present disclosure.

FIG. 11 shows a diagram of a system 1100 including a device 1105 that supports location reporting for a UE in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

In some examples, the communications manager 1110 may receive (e.g., via transceiver 1120) a request from a base station for the UE to report condensed location information of the UE to the base station, the condensed location information including fewer bits than information associated with a full global navigation satellite system coordinate of the UE, determine a location of the UE based on receiving the request, and output (e.g., to transceiver 1120) the condensed location information for transmission to the base station based on the determination of the location of the UE and the request.

In some examples, the communications manager 1110 may receive (e.g., via transceiver 1120) a request from a base station for the UE to report location information, determine the location information based on the request, and output (e.g., to transceiver 1120) the location information for transmission to the base station during a random access procedure or after the random access procedure is successfully completed.

In some examples, the communications manager 1110 may a receive (e.g., via transceiver 1120), from a base station before a radio resource control connection is established with the UE, a request for the UE to transmit a reference signal for identifying a location of the UE and output (e.g., to transceiver 1120) the reference signal for transmission based on the request received from the base station, where the reference signal is outputted before or after the radio resource control connection is established.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting location reporting for a UE).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
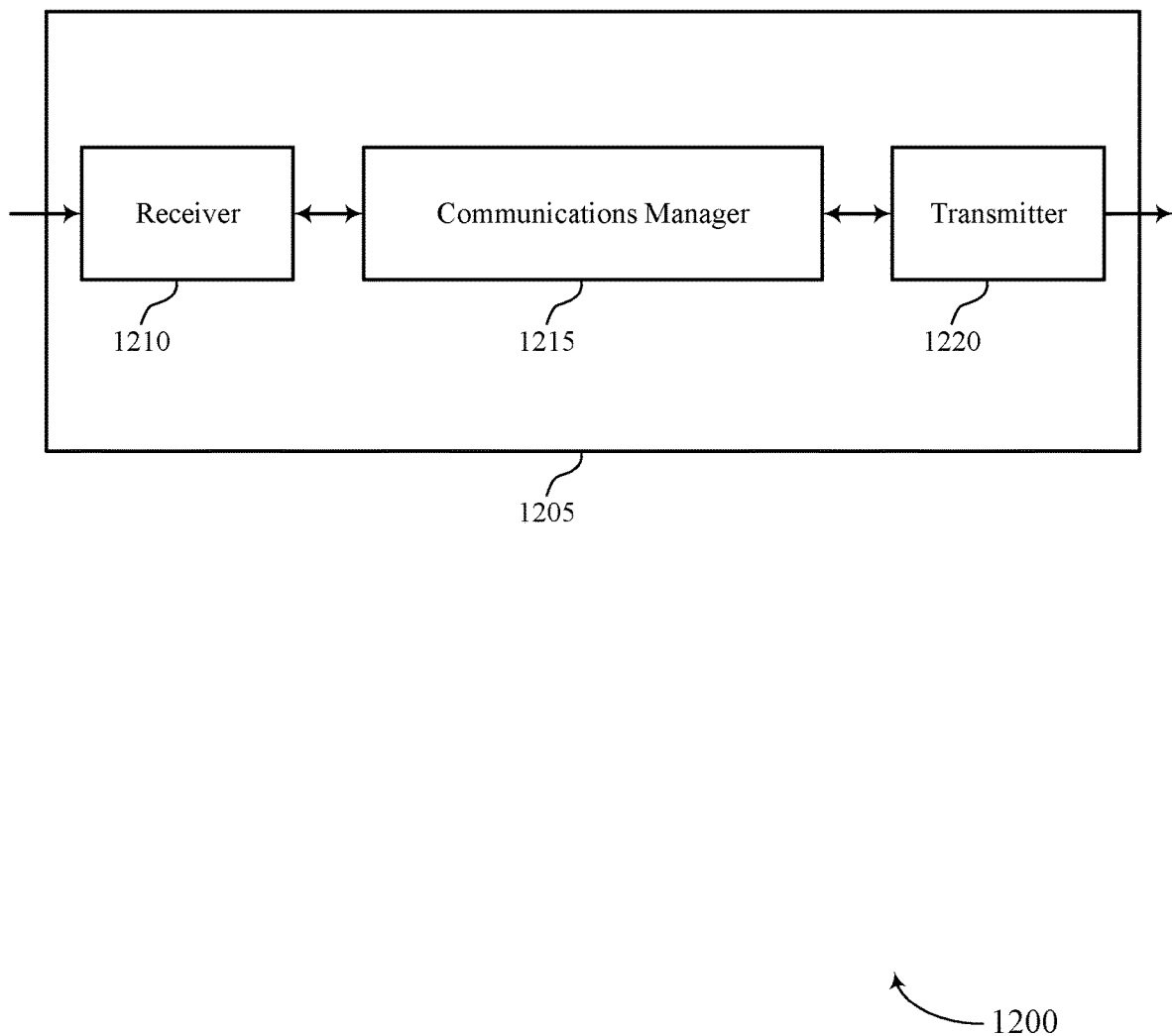
FIGS. 12 and 13 show block diagrams of devices that support location reporting for a UE in accordance with aspects of the present disclosure.

FIG. 12 shows a block diagram 1200 of a device 1205 that supports location reporting for a UE in accordance with aspects of the present disclosure. The device 1205 may be an example of aspects of a base station 105 as described herein. The device 1205 may include a receiver 1210, a communications manager 1215 (which may be an example of a processing system), and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to location reporting for a UE, etc.). Information may be passed on to other components of the device 1205. The receiver 1210 may be an example of aspects of the transceiver 1520 described with reference to FIG. 15. The receiver 1210 may utilize a single antenna or a set of antennas.

In some examples, the communications manager 1215 may output (e.g., to transmitter 1220), for transmission to a UE, a request for the UE to report condensed location information of the UE to the base station, the condensed location information including fewer bits than information associated with a full global navigation satellite system coordinate of the UE, obtain (e.g., via receiver 1210) the condensed location information based on outputting the request, and determine a location of the UE based on the condensed location information.

In some examples, the communications manager 1215 may output (e.g., to transmitter 1220), for transmission to a UE during a random access procedure or after the random access procedure is successfully completed, a request for the UE to report location information, obtain the location information from the UE during the random access procedure or after the random access procedure is successfully completed, and determine a location of the UE based on the location information.

In some examples, the communications manager 1215 may output (e.g., to transmitter 1220), for transmission to a UE during a random access procedure, a request for the UE to report a timing advance between the UE and the base station, obtain an indication of the timing advance from the UE during the random access procedure, and determine a location of the UE based at least in part on the timing advance.

In some examples, the communications manager 1215 may output (e.g., to transmitter 1220), for transmission to a UE in a coverage area of the base station, a request for the UE to transmit a reference signal periodically, monitor a portion of the coverage area for the reference signal based on outputting the request, and determine a location of the UE within the coverage area based on monitoring the portion of the coverage area for the reference signal. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
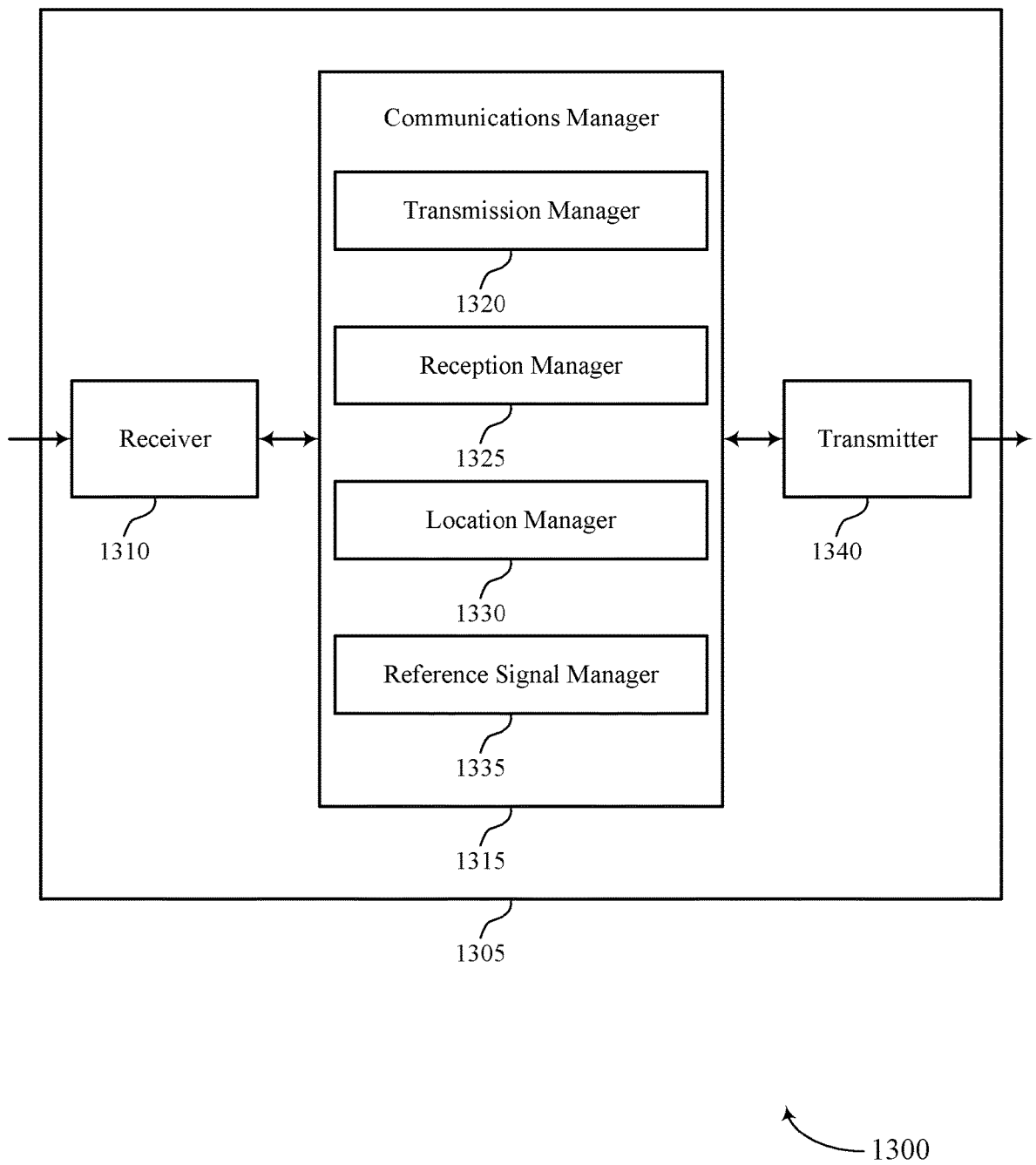

FIG. 13 shows a block diagram 1300 of a device 1305 that supports location reporting for a UE in accordance with aspects of the present disclosure. The device 1305 may be an example of aspects of a device 1205, or a base station 105 as described herein. The device 1305 may include a receiver 1310, a communications manager 1315 (which may be an example of a processing system), and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to location reporting for a UE, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a transmission manager 1320, a reception manager 1325, a location manager 1330, and a reference signal manager 1335. The communications manager 1315 may be an example of aspects of the communications manager 1510 described herein.

The transmission manager 1320 may output, for transmission to a UE, a request for the UE to report condensed location information of the UE to the base station, the condensed location information including fewer bits than information associated with a full global navigation satellite system coordinate of the UE.

The reception manager 1325 may obtain the condensed location information based on outputting the request. The location manager 1330 may determine a location of the UE based on the condensed location information. The transmission manager 1320 may output, for transmission to a UE during a random access procedure or after the random access procedure is successfully completed, a request for the UE to report location information.

The reception manager 1325 may obtain the location information from the UE during the random access procedure or after the random access procedure is successfully completed. The location manager 1330 may determine a location of the UE based on the location information. The transmission manager 1320 may output, for transmission to a UE in a coverage area of the base station, a request for the UE to transmit a reference signal periodically.

The reference signal manager 1335 may monitor a portion of the coverage area for the reference signal based on outputting the request. The location manager 1330 may determine a location of the UE within the coverage area based on monitoring the portion of the coverage area for the reference signal.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
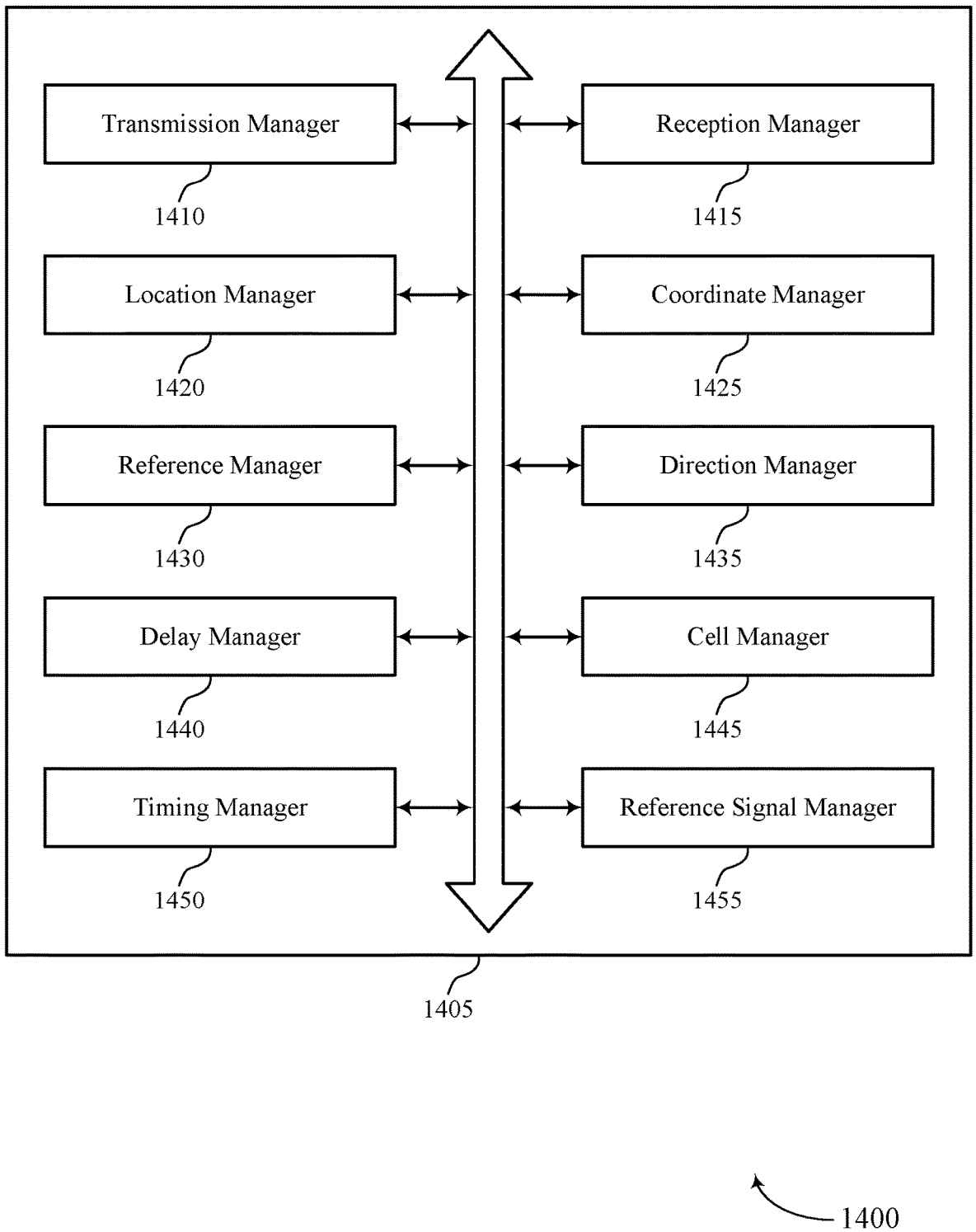
FIG. 14 shows a block diagram of a communications manager that supports location reporting for a UE in accordance with aspects of the present disclosure.

FIG. 14 shows a block diagram 1400 of a communications manager 1405 that supports location reporting for a UE in accordance with aspects of the present disclosure. The communications manager 1405 may be an example of aspects of a communications manager 1215, a communications manager 1315, or a communications manager 1510 described herein. The communications manager 1405 may include a transmission manager 1410, a reception manager 1415, a location manager 1420, a coordinate manager 1425, a reference manager 1430, a direction manager 1435, a delay manager 1440, a cell manager 1445, a timing manager 1450, and a reference signal manager 1455. Each of these modules may communicate, directly or indirectly, with one another (e.g., via one or more buses).

The transmission manager 1410 may output, for transmission to a UE, a request for the UE to report condensed location information of the UE to the base station, the condensed location information including fewer bits than information associated with a full global navigation satellite system coordinate of the UE.

In some examples, the transmission manager 1410 may output, for transmission to a UE during a random access procedure or after the random access procedure is successfully completed, a request for the UE to report location information. In some examples, the transmission manager 1410 may output, for transmission to a UE in a coverage area of the base station, a request for the UE to transmit a reference signal periodically.

In some examples, the transmission manager 1410 may output for transmission to the UE a first geographic coordinate for a reference location, where the condensed location information includes a coordinate differential including a difference between the first geographic coordinate of the reference location and a second geographic coordinate of the UE.

In some examples, the transmission manager 1410 may output, for transmission to the UE, an indication of a reference location associated with the reference ray, where the angle is based on the reference location and the orientation of the reference ray.

In some examples, the transmission manager 1410 may output, for transmission to the UE during the random access procedure, a second request to transmit a reference signal. In some cases, the request is included in a SIB broadcast by the base station. The reception manager 1415 may receive the condensed location information based on transmitting the request.

In some examples, the reception manager 1415 may obtain the location information from the UE during the random access procedure or after the random access procedure is successfully completed. In some examples, the reception manager 1415 may obtain the reference signal from the UE, where determining the location of the UE is based on an angle of arrival for the reference signal.

In some examples, the reception manager 1415 may obtain the reference signal based on monitoring the portion of the coverage area, where the location of the UE is determined to be in the portion of the coverage area based on obtaining the reference signal. In some examples, the reception manager 1415 may determine that the base station has not obtained the reference signal while monitoring the portion of the coverage area, where the location of the UE is determined to be in a second portion of the coverage area based on not obtaining the reference signal.

In some cases, the random access procedure includes a four-step random access procedure and the location information is included in Message 5 of the four-step random access procedure. In some cases, the random access procedure includes a two-step random access procedure and the location information is included in Message A or Message 3 of the two-step random access procedure.

The location manager 1420 may determine a location of the UE based on the condensed location information. In some examples, the location manager 1420 may determine a location of the UE based on the location information.

In some examples, the location manager 1420 may determine a location of the UE within the coverage area based on monitoring the portion of the coverage area for the reference signal. In some examples, the location manager 1420 may determine that the coverage area spans at least a first portion of a first country and at least a second portion of a second country, where the request is transmitted based on determining that the coverage area spans at least the first portion of the first country and at least the second portion of the second country.

In some examples, the location manager 1420 may determine a second location that is covered by the second coverage area when the reference signal is obtained, where the location of the UE is determined based on the second location that is covered by the second coverage area.

The reference signal manager 1455 may output (e.g., to a transceiver) an indication monitor a portion of the coverage area for the reference signal based on outputting the request. In some examples, the reference signal manager 1455 may determine the portion of the coverage area to monitor based on the timing advance.

The coordinate manager 1425 may determine a subset of digits of a geographic coordinate based on a threshold precision for a beam management procedure with the UE, where the request indicates the subset of digits and the condensed location information includes a truncated version of the geographic coordinate that is based on the subset of digits.

In some examples, the coordinate manager 1425 may determine a coverage area of a transmission beam of the base station, where the threshold precision is based on a size of the coverage area, a shape of the coverage area, or a combination thereof. The reference manager 1430 may select a center of a transmission beam of the base station as the reference location.

The direction manager 1435 may determine an angle of a position of the UE relative to a reference ray, where the request indicates the reference ray and the condensed location information includes the angle, where the location of the UE is based on the angle.

In some examples, the direction manager 1435 may obtain a direction of the UE relative to a center of a coverage area, where determining the location of the UE is based on the direction. In some examples, the direction manager 1435 may obtain an angle associated with the UE relative to a reference ray indicated by the base station, where determining the location of the UE based on the angle.

The delay manager 1440 may determine a propagation delay between the UE and the base station, where the location of the UE is determined based on the propagation delay and the angle. In some examples, the delay manager 1440 may determine a distance between the UE and the base station based on a timing advance between the UE and the base station.

The cell manager 1445 may obtain an identifier of a second cell associated with a strongest signal relative to cells other than the first cell, where determining the location of the UE is based on the identifier of the second cell. In some examples, the cell manager 1445 may obtain identifiers of a set of cells each associated with a respective signal strength that satisfies a threshold, where determining the location of the is UE based on the identifiers of the set of cells.

The timing manager 1450 may obtain an indication of a timing advance between the UE and the base station, where the location of the UE is determined based on the timing advance. In some examples, the timing manager 1450 may obtain an indication of a second timing advance between the UE and a second base station, where determining the location of the UE is based on the second timing advance. In some examples, the timing manager 1450 may obtain an indication of a timing advance between the UE and the base station based on the request. In some examples, the timing manager 1450 may determine a reception timing for a downlink transmission from the base station and a transmission timing for an uplink transmission to the base station in response to the downlink transmission, where the location information comprises an indication of a timing difference between the reception timing and the transmission timing.

Figure 15:
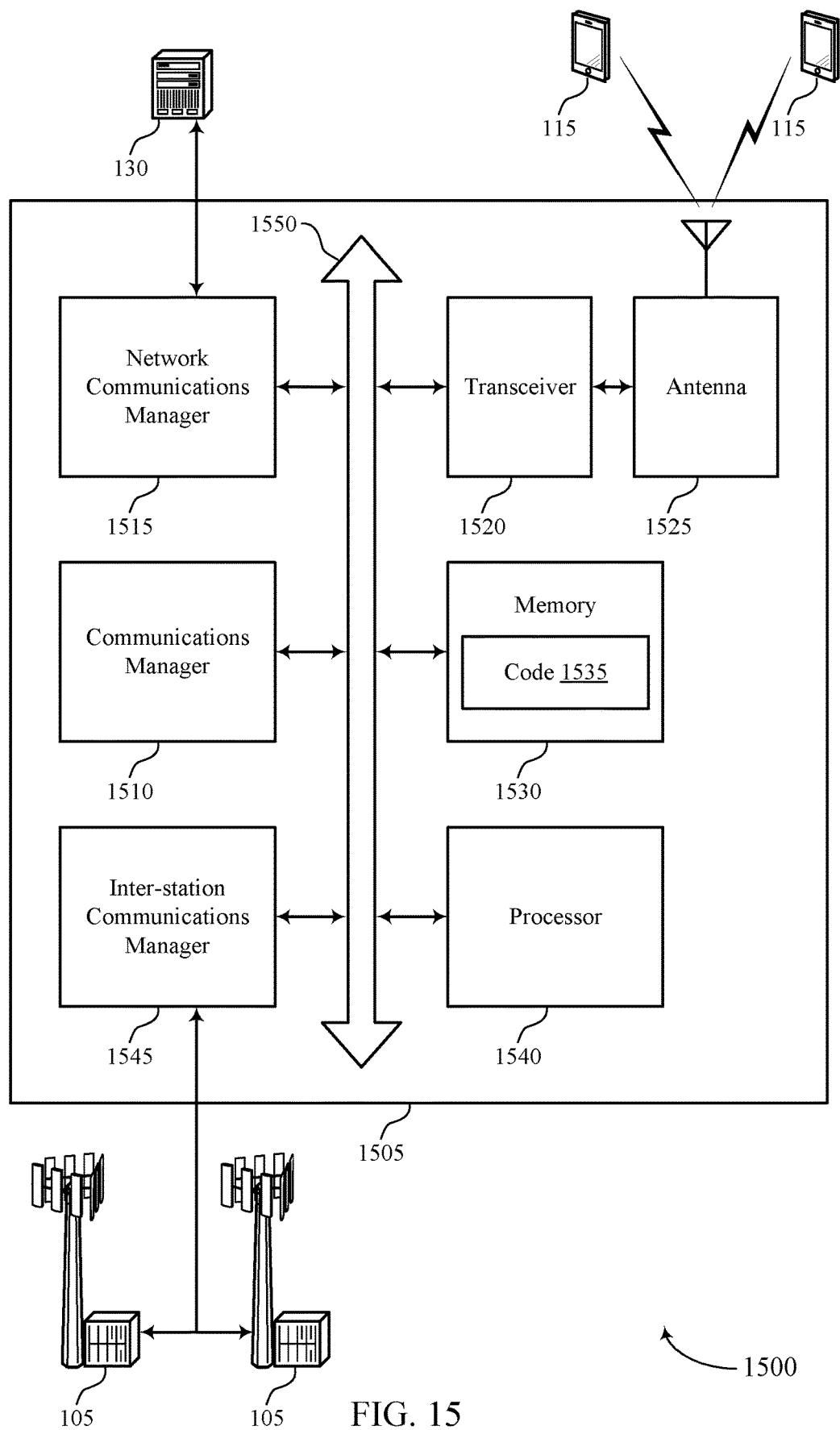
FIG. 15 shows a diagram of a system including a device that supports location reporting for a UE in accordance with aspects of the present disclosure.

FIG. 15 shows a diagram of a system 1500 including a device 1505 that supports location reporting for a UE in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

In some examples, the communications manager 1510 may output, for transmission to a UE, a request for the UE to report condensed location information of the UE to the base station, the condensed location information including fewer bits than information associated with a full global navigation satellite system coordinate of the UE, obtain the condensed location information based on outputting the request, and determine a location of the UE based on the condensed location information.

In some examples, the communications manager 1510 may output, for transmission to a UE during a random access procedure or after the random access procedure is successfully completed, a request for the UE to report location information, obtain the location information from the UE during the random access procedure or after the random access procedure is successfully completed, and determine a location of the UE based on the location information.

In some examples, the communications manager 1510 may output, for transmission to a UE in a coverage area of the base station, a request for the UE to transmit a reference signal periodically, monitor a portion of the coverage area for the reference signal based on outputting the request, and determine a location of the UE within the coverage area based on monitoring the portion of the coverage area for the reference signal.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting location reporting for a UE).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
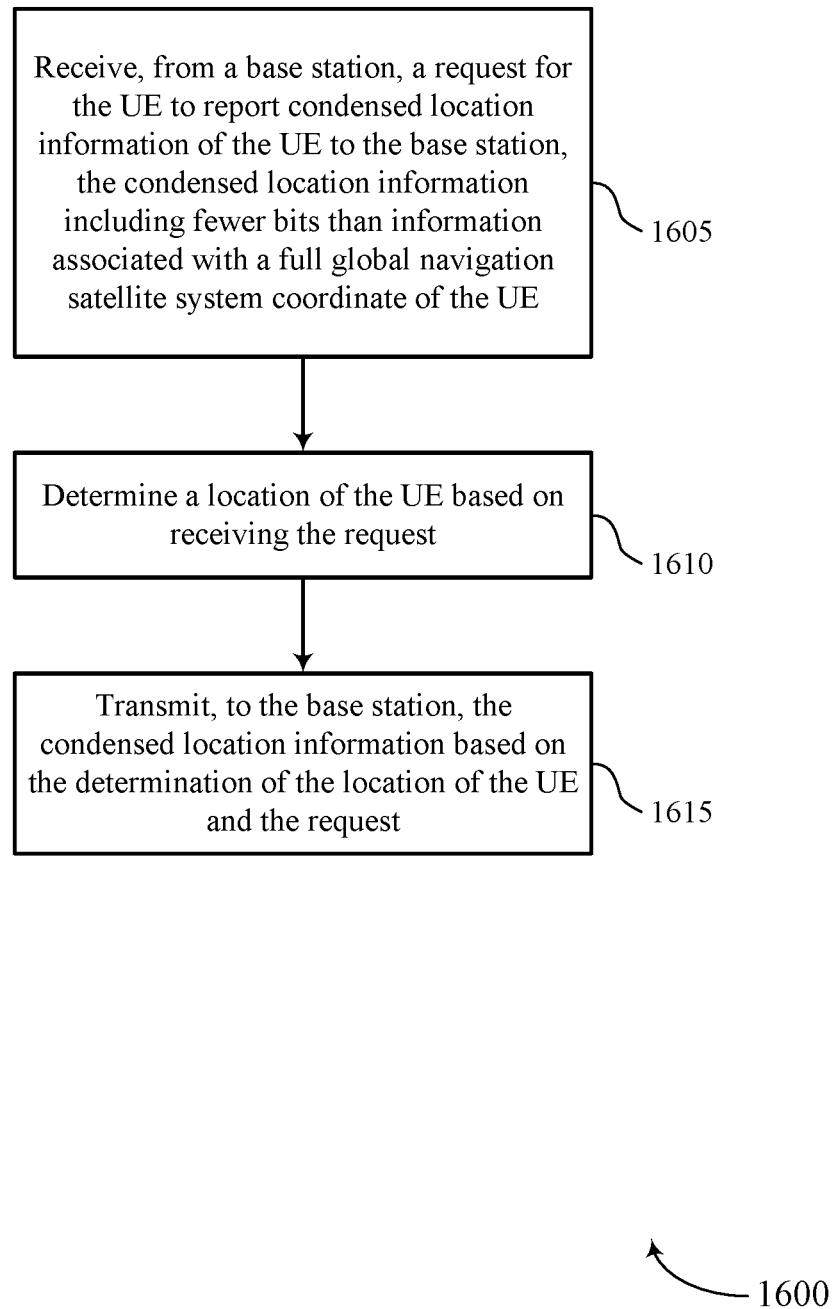
FIGS. 16 through 21 show flowcharts illustrating methods that support location reporting for a UE in accordance with aspects of the present disclosure.

FIG. 16 shows a flowchart illustrating a method 1600 that supports location reporting for a UE in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a request for the UE to report condensed location information of the UE to the base station, the condensed location information including fewer bits than information associated with a full global navigation satellite system coordinate of the UE. The operations of 1605 may be performed according to the methods described herein. In some examples, aspects of the operations of 1605 may be performed by a reception manager as described with reference to FIGS. 8 through 11.

At 1610, the UE may determine a location of the UE based on receiving the request. The operations of 1610 may be performed according to the methods described herein. In some examples, aspects of the operations of 1610 may be performed by a location manager as described with reference to FIGS. 8 through 11.

At 1615, the UE may transmit, to the base station, the condensed location information based on the determination of the location of the UE and the request. The operations of 1615 may be performed according to the methods described herein. In some examples, aspects of the operations of 1615 may be performed by a transmission manager as described with reference to FIGS. 8 through 11.

Figure 17:
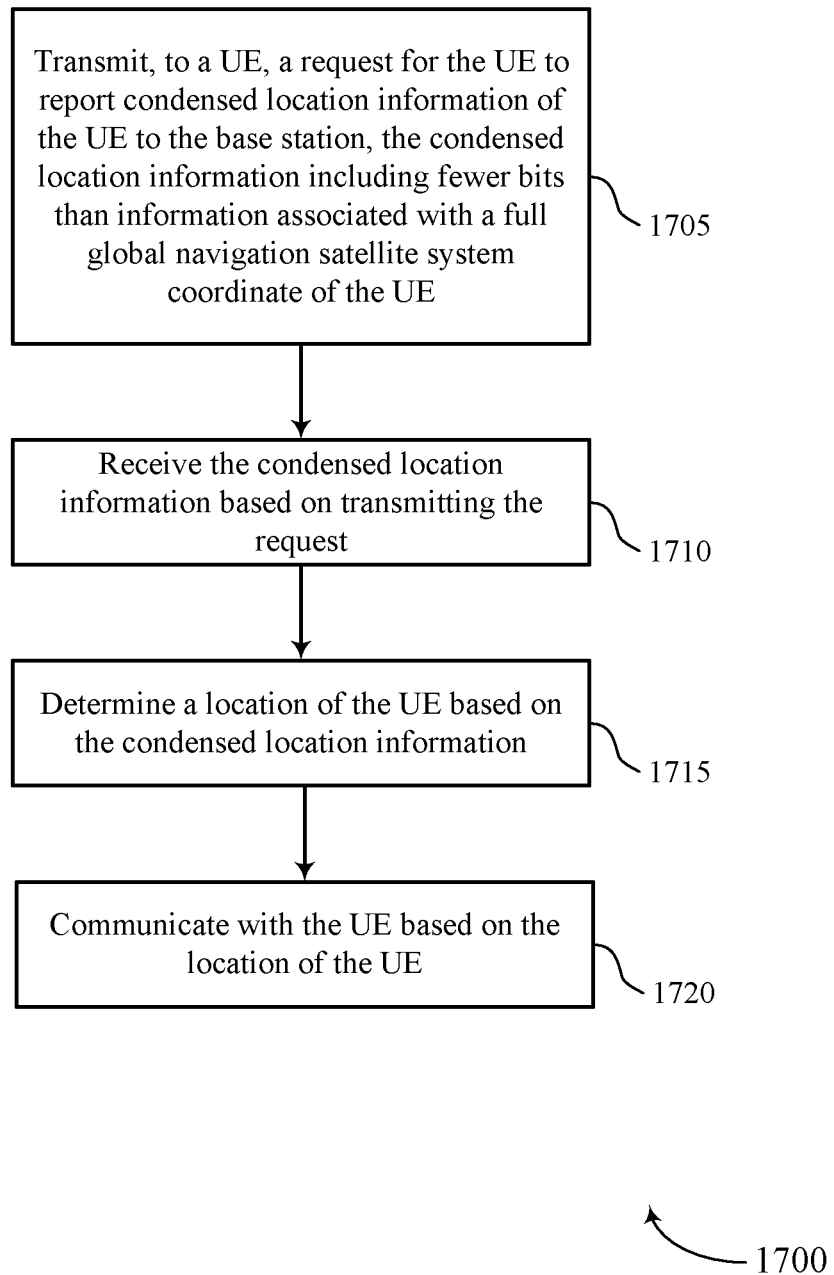

FIG. 17 shows a flowchart illustrating a method 1700 that supports location reporting for a UE in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a request for the UE to report condensed location information of the UE to the base station, the condensed location information including fewer bits than information associated with a full global navigation satellite system coordinate of the UE. The operations of 1705 may be performed according to the methods described herein. In some examples, aspects of the operations of 1705 may be performed by a transmission manager as described with reference to FIGS. 12 through 15.

At 1710, the base station may receive the condensed location information based on transmitting the request. The operations of 1710 may be performed according to the methods described herein. In some examples, aspects of the operations of 1710 may be performed by a reception manager as described with reference to FIGS. 12 through 15.

At 1715, the base station may determine a location of the UE based on the condensed location information. The operations of 1715 may be performed according to the methods described herein. In some examples, aspects of the operations of 1715 may be performed by a location manager as described with reference to FIGS. 12 through 15.

At 1720 the base station may communicate with the UE based on the location of the UE. The operations of 1720 may be performed according to the methods described herein. In some examples, aspects of the operations of 1720 may be performed by a transmission manager as described with reference to FIGS. 12 through 15

Figure 18:
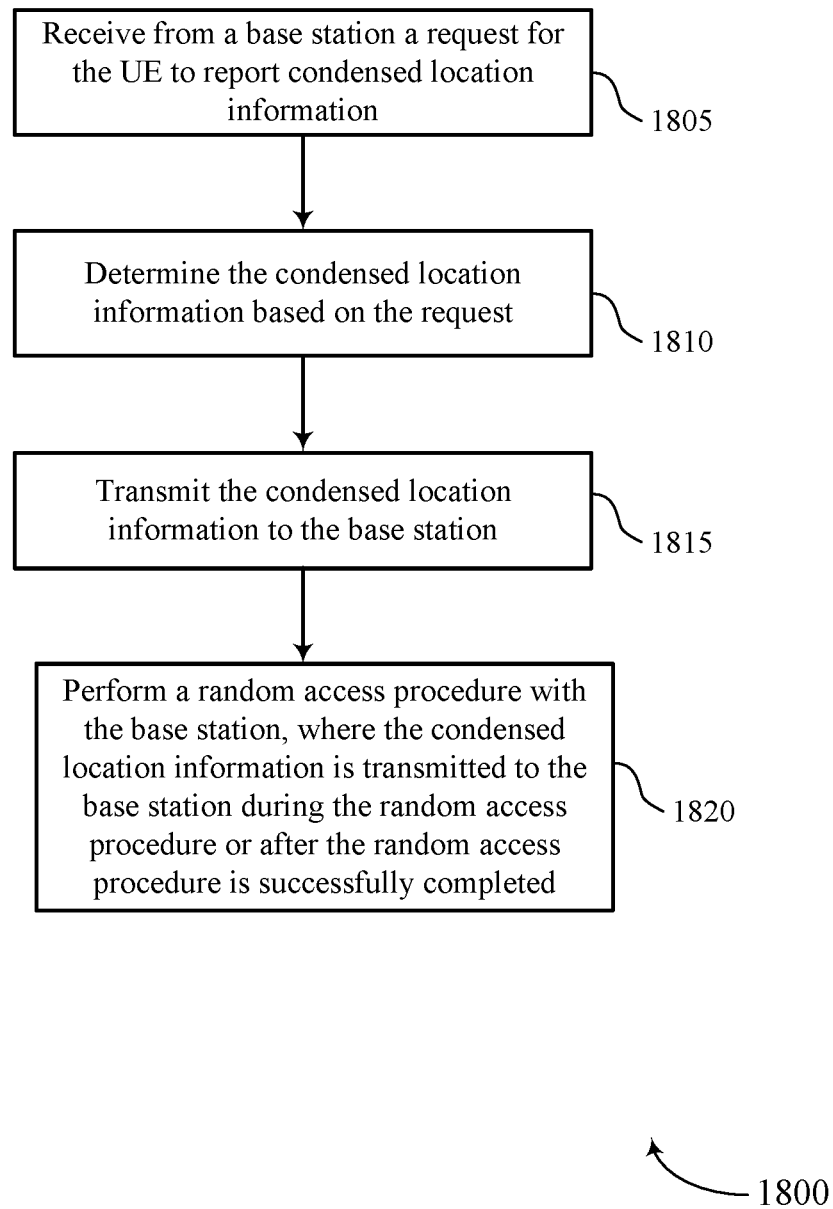

FIG. 18 shows a flowchart illustrating a method 1800 that supports location reporting for a UE in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive from a base station a request for the UE to report condensed location information. The operations of 1805 may be performed according to the methods described herein. In some examples, aspects of the operations of 1805 may be performed by a reception manager as described with reference to FIGS. 8 through 11.

At 1810, the UE may determine the condensed location information based on the request. The operations of 1810 may be performed according to the methods described herein. In some examples, aspects of the operations of 1810 may be performed by a location manager as described with reference to FIGS. 8 through 11.

At 1815, the UE may transmit the condensed location information to the base station during a random access procedure or after the random access procedure is successfully completed. The operations of 1815 may be performed according to the methods described herein. In some examples, aspects of the operations of 1815 may be performed by a transmission manager as described with reference to FIGS. 8 through 11.

At 1820, UE may perform a random access procedure with the base station, where the condensed location information is transmitted during the random access procedure or after the random access procedure is successfully completed. The operations of 1820 may be performed according to the methods described herein. In some examples, aspects of the operations of 1820 may be performed by a transmission manager as described with reference to FIGS. 8 through 11.

Figure 19:
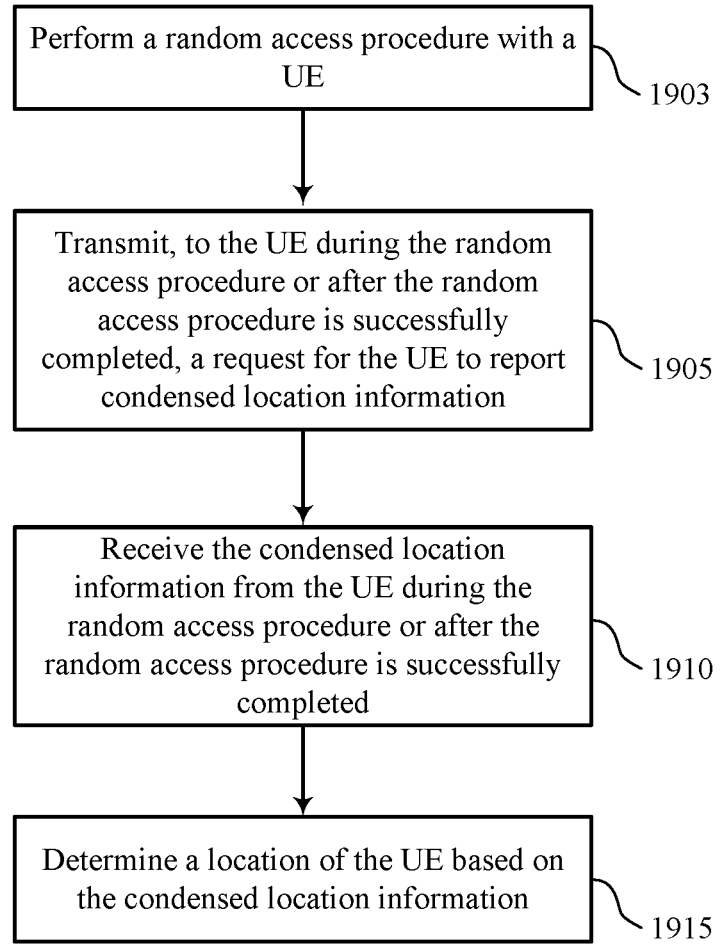

FIG. 19 shows a flowchart illustrating a method 1900 that supports location reporting for a UE in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1903, the base station may perform a random access procedure with a UE. The operations of 1903 may be performed according to the methods described herein. In some examples, aspects of the operations of 1903 may be performed by a transmission manager as described with reference to FIGS. 12 through 15.

At 1905, the base station may transmit, to the UE during the random access procedure or after the random access procedure is successfully completed, a request for the UE to report condensed location information. The operations of 1905 may be performed according to the methods described herein. In some examples, aspects of the operations of 1905 may be performed by a transmission manager as described with reference to FIGS. 12 through 15.

At 1910, the base station may receive the condensed location information from the UE during the random access procedure or after the random access procedure is successfully completed. The operations of 1910 may be performed according to the methods described herein. In some examples, aspects of the operations of 1910 may be performed by a reception manager as described with reference to FIGS. 12 through 15.

At 1915, the base station may determine a location of the UE based on the condensed location information. The operations of 1915 may be performed according to the methods described herein. In some examples, aspects of the operations of 1915 may be performed by a location manager as described with reference to FIGS. 12 through 15.

Figure 20:
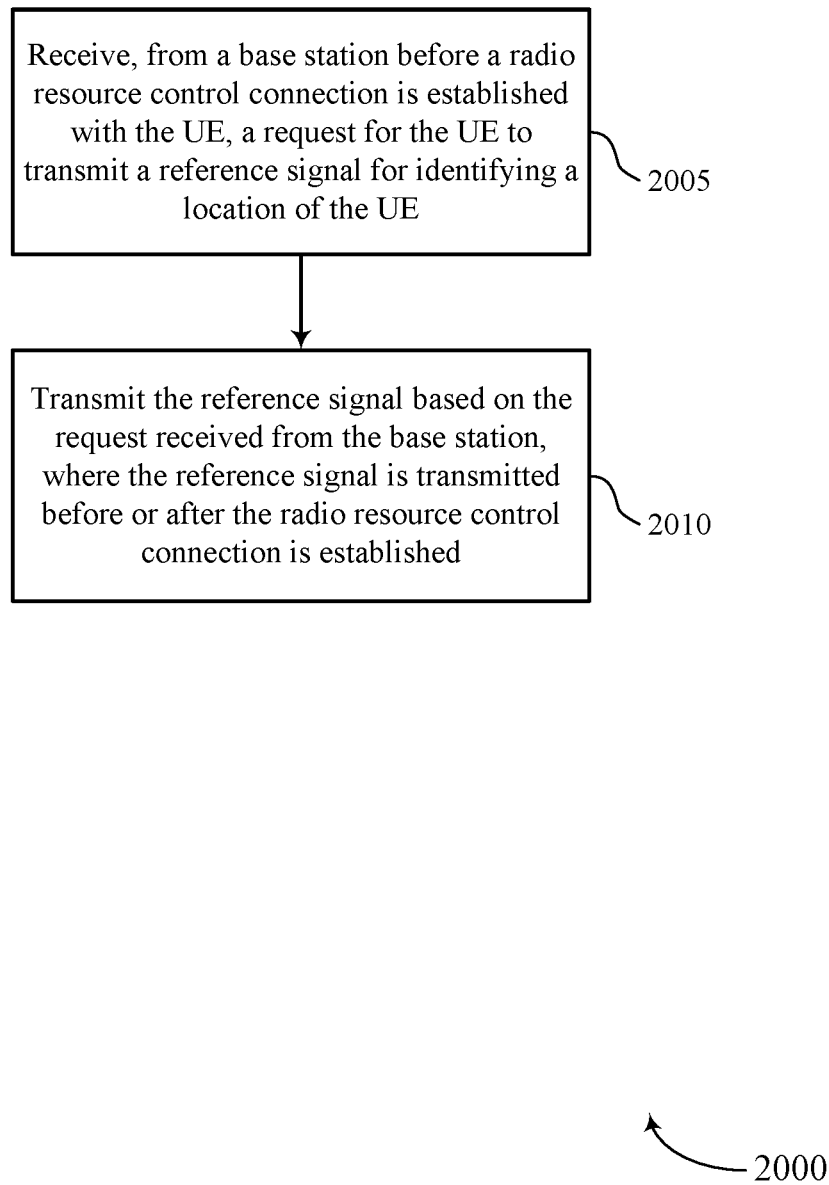

FIG. 20 shows a flowchart illustrating a method 2000 that supports location reporting for a UE in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station before a radio resource control connection is established with the UE, a request for the UE to transmit a reference signal for identifying a location of the UE. The operations of 2005 may be performed according to the methods described herein. In some examples, aspects of the operations of 2005 may be performed by a reception manager as described with reference to FIGS. 8 through 11.

At 2010, the UE may transmit the reference signal based on the request received from the base station, where the reference signal is transmitted before or after the radio resource control connection is established. The operations of 2010 may be performed according to the methods described herein. In some examples, aspects of the operations of 2010 may be performed by a transmission manager as described with reference to FIGS. 8 through 11.

Figure 21:
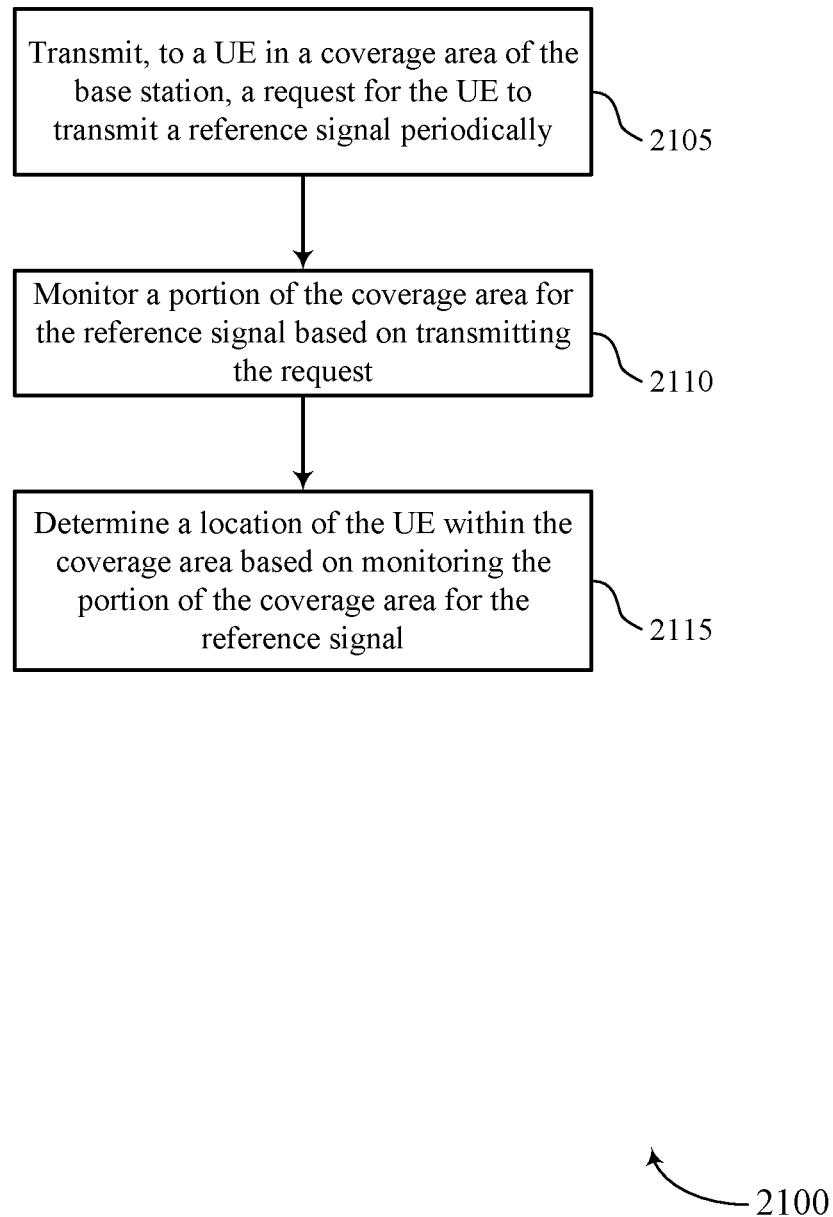

FIG. 21 shows a flowchart illustrating a method 2100 that supports location reporting for a UE in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE in a coverage area of the base station, a request for the UE to transmit a reference signal periodically. The operations of 2105 may be performed according to the methods described herein. In some examples, aspects of the operations of 2105 may be performed by a transmission manager as described with reference to FIGS. 12 through 15.

At 2110, the base station may monitor a portion of the coverage area for the reference signal based on transmitting the request. The operations of 2110 may be performed according to the methods described herein. In some examples, aspects of the operations of 2110 may be performed by a reference signal manager as described with reference to FIGS. 12 through 15.

At 2115, the base station may determine a location of the UE within the coverage area based on monitoring the portion of the coverage area for the reference signal. The operations of 2115 may be performed according to the methods described herein. In some examples, aspects of the operations of 2115 may be performed by a location manager as described with reference to FIGS. 12 through 15.

The following provides an overview of aspects of the present disclosure:

Aspect 1: A method for wireless communication at an apparatus comprising: receiving, from a base station, a request for the apparatus to report condensed location information of the apparatus to the base station, the condensed location information comprising fewer bits than information associated with a full global navigation satellite system coordinate of the apparatus; determining a location of the apparatus based at least in part on receiving the request; and transmitting, to the base station, the condensed location information based at least in part on the determination of the location of the apparatus and the request.

Aspect 2: The method of aspect 1, wherein the apparatus comprises a receiver and a transmitter.

Aspect 3: The method of aspect 1 or aspect 2, wherein determining the location of the apparatus comprises: determining a geographic coordinate comprising a set of digits, wherein the request indicates a subset of digits of the set of digits, and further wherein the condensed location information comprises a truncated version of the geographic coordinate that is based at least in part on the subset of digits.

Aspect 4: The method of aspect 3, wherein the geographic coordinate represents a longitude of the apparatus or a latitude of the apparatus.

Aspect 5: The method of any of aspects 1 through 4, wherein determining the location of the apparatus comprises: determining a coordinate differential comprising a difference between a first geographic coordinate of a reference location and a second geographic coordinate of the apparatus, wherein the request indicates the reference location and the condensed location information comprises the coordinate differential.

Aspect 6: The method of aspect 5, further comprising: receiving the first geographic coordinate of the reference location from the base station, wherein determining the coordinate differential is based at least in part on receiving the first geographic coordinate of the reference location.

Aspect 7: The method of any of aspects 1 through 6, wherein determining the location of the apparatus comprises: determining an angle associated with the location of the apparatus relative to a reference ray with a starting point at a reference location, wherein the request indicates the reference ray and the condensed location information comprises the angle.

Aspect 8: The method of aspect 7, further comprising: receiving, from the base station, an indication of the reference location and an orientation of the reference ray associated with the reference location, wherein the reference ray is determined based at least in part on receiving the indication of the reference location and the orientation.

Aspect 9: The method of any of aspects 7 through 8, further comprising: receiving, from the base station, an indication of the reference location; and determining, by the apparatus, an orientation of the reference ray associated with the reference location, wherein the reference ray is determined based at least in part on the reference location and the orientation.

Aspect 10: The method of any of aspects 1 through 9, wherein the condensed location information is transmitted during a random access procedure or after the random access procedure is successfully completed.

Aspect 11: A method for wireless communication at an apparatus, comprising: transmitting, to a UE, a request for the UE to report condensed location information of the UE to the apparatus, the condensed location information comprising fewer bits than information associated with a full global navigation satellite system coordinate of the UE; receiving the condensed location information based at least in part on transmitting the request; determining a location of the UE based at least in part on the condensed location information; and communicating with the UE based at least in part on the location of the UE.

Aspect 12: The method of aspect 11, wherein the apparatus comprises a receiver and a transmitter.

Aspect 13: The method of aspect 11 or aspect 12, further comprising: determining a subset of digits of a geographic coordinate based at least in part on a threshold precision for a beam management procedure with the UE, wherein the request indicates the subset of digits, and further wherein the condensed location information comprises a truncated version of the geographic coordinate that is based at least in part on the subset of digits.

Aspect 14: The method of aspect 13, further comprising: determining a coverage area of a transmission beam of the apparatus, wherein the threshold precision is based at least in part on a size of the coverage area, a shape of the coverage area, or a combination thereof Aspect 15: The method of any of aspects 11 through 14, further comprising: transmitting to the UE a first geographic coordinate for a reference location, wherein the condensed location information comprises a coordinate differential comprising a difference between the first geographic coordinate of the reference location and a second geographic coordinate of the UE.

Aspect 16: The method of aspect 15, further comprising: selecting a center of a transmission beam of the apparatus as the reference location.

Aspect 17: The method of any of aspects 11 through 16, wherein determining the location of the UE comprises: determining an angle of a position of the UE relative to a reference ray, wherein the request indicates the reference ray and the condensed location information comprises the angle, wherein the location of the UE is based at least in part on the angle.

Aspect 18: The method of aspect 17, further comprising: determining a propagation delay between the UE and the apparatus, wherein the location of the UE is determined based at least in part on the propagation delay and the angle.

Aspect 19: The method of any of aspects 17 through 18, further comprising: transmitting, to the UE, an indication of a reference location associated with the reference ray, wherein the angle is based at least in part on the reference location and an orientation of the reference ray.

Aspect 20: A method for wireless communication at an apparatus, comprising: receiving from a base station a request for the apparatus to report condensed location information; determining the condensed location information based at least in part on the request; transmitting the condensed location information to the base station; and performing a random access procedure with the base station, wherein the condensed location information is transmitted during the random access procedure or after the random access procedure is successfully completed.

Aspect 21: The method of aspect 20, wherein the apparatus comprises a receiver and a transmitter.

Aspect 22: The method of aspect 20 or aspect 21, wherein the random access procedure comprises a four-step random access procedure and the condensed location information is included in Message 5 of the four-step random access procedure.

Aspect 23: The method of any of aspects 20 through 22, wherein the random access procedure comprises a two-step random access procedure and the condensed location information is included in Message A or Message 3 of the two-step random access procedure.

Aspect 24: The method of any of aspects 20 through 23, wherein the request is included in an SIB broadcast by the base station.

Aspect 25: The method of any of aspects 20 through 24, wherein the base station is associated with a first cell, the method further comprising: determining a second cell associated with a strongest signal relative to cells other than the first cell, wherein the condensed location information comprises an identifier of the second cell.

Aspect 26: The method of any of aspects 20 through 25, further comprising: determining a set of cells each associated with a respective signal strength that satisfies a threshold, wherein the condensed location information comprises identifiers of the set of cells.

Aspect 27: The method of any of aspects 20 through 26, further comprising: determining a timing advance between the apparatus and the base station, wherein the condensed location information comprises an indication of the timing advance.

Aspect 28: The method of aspect 27, further comprising: determining a second timing advance between the apparatus and a second base station; and transmitting a second indication of the second timing advance to the base station based at least in part on transmitting the indication of the timing advance.

Aspect 29: The method of aspect 20 or aspect 27, wherein the condensed location information further comprises a direction of the apparatus with respect to a reference location and one or more indications of timing advances associated with different time intervals.

Aspect 30: The method of claim 20, further comprising: determining, based at least in part on location information for the apparatus, a position of the apparatus relative to a reference location indicated by the base station, wherein the condensed location information indicates a direction of the apparatus with respect to the reference location.

Aspect 31: The method of claim 20, further comprising: determine, based at least in part on location information for the apparatus, a tracking area code for a tracking area associated with a position of the apparatus relative to a reference location indicated by the base station, wherein the condensed location information indicates the tracking area code.

Aspect 32: The method of claim 20, further comprising: determine, based at least in part on location information for the apparatus, an identifier for a zone in which the apparatus is positioned relative to a reference location indicated by the base station, wherein the condensed location information indicates the identifier for the zone.

Aspect 33: The method of any of aspects 20 through 31, further comprising: determining a reception timing for a downlink transmission from the base station and a transmission timing for an uplink transmission to the base station in response to the downlink transmission, wherein the condensed location information comprises an indication of a timing difference between the reception timing and the transmission timing.

Aspect 34: The method of any of aspects 20 through 33, further comprising: determining a direction of the apparatus relative to a center of a coverage area of a transmission beam of the base station, wherein the condensed location information comprises the direction.

Aspect 35: The method of any of aspects 20 through 34, further comprising: determining an angle associated with the apparatus relative to a reference ray indicated by the base station, wherein the condensed location information comprises the angle.

Aspect 36: The method of any of aspects 20 through 35, further comprising: receiving, from the base station during the random access procedure, a second indication to transmit a reference signal for identifying a location of the apparatus; and transmitting the reference signal based at least in part on the second indication.

Aspect 37: A method for wireless communication at an apparatus, comprising: performing a random access procedure with a UE; transmitting, to a UE during a random access procedure or after the random access procedure is successfully completed, a request for the UE to report condensed location information; receiving the condensed location information from the UE during the random access procedure or after the random access procedure is successfully completed; determining a location of the UE based at least in part on the condensed location information; and communicating with the UE based at least in part on the location of the UE.

Aspect 38: The method of aspect 37, wherein the apparatus comprises a receiver and a transmitter.

Aspect 39: The method of aspect 37 or aspect 34, wherein the random access procedure comprises a four-step random access procedure and the condensed location information is included in Message 5 of the four-step random access procedure.

Aspect 40: The method of any of aspects 37 through 39, wherein the random access procedure comprises a two-step random access procedure and the condensed location information is included in Message A or a third message (e.g., Message 3) of the two-step random access procedure.

Aspect 41: The method of any of aspects 37 through 40, wherein the request is included in an SIB broadcast by the apparatus.

Aspect 42: The method of any of aspects 37 through 41, wherein determining the location of the UE comprises: determining a distance between the UE and the apparatus based at least in part on a timing advance between the UE and the apparatus.

Aspect 43: The method of any of aspects 37 through 42, wherein the apparatus is associated with a first cell, and wherein receiving the condensed location information comprises: receiving an identifier of a second cell associated with a strongest signal relative to cells other than the first cell, wherein determining the location of the UE is based at least in part on the identifier of the second cell.

Aspect 44: The method of any of aspects 37 through 43, wherein receiving the condensed location information comprises: receiving identifiers of a set of cells each associated with a respective signal strength that satisfies a threshold, wherein determining the location of the is UE based at least in part on the identifiers of the set of cells.

Aspect 45: The method of any of aspects 37 through 44, wherein receiving the condensed location information comprises: receiving an indication of a timing advance between the UE and the apparatus, wherein the location of the UE is determined based at least in part on the timing advance.

Aspect 46: The method of aspect 45, wherein receiving the condensed location information comprises: receiving a second indication of a second timing advance between the UE and a second apparatus, wherein determining the location of the UE is based at least in part on the second timing advance.

Aspect 47: The method of any of aspects 37 through 46, wherein receiving the condensed location information comprises: receiving a direction of the UE relative to a center of a coverage area, wherein determining the location of the UE is based at least in part on the direction.

Aspect 48: The method of any of aspects 37 through 47, wherein receiving the condensed location information comprises: receiving an angle associated with the UE relative to a reference ray indicated by the apparatus, wherein determining the location of the UE based at least in part on the angle.

Aspect 49: The method of any of aspects 37 through 48, further comprising: transmitting, to the UE during the random access procedure, a second request to transmit a reference signal; and receiving the reference signal from the UE, wherein determining the location of the UE is based at least in part on an angle of arrival for the reference signal.

Aspect 50: A method for wireless communication at an apparatus, comprising: receiving, from a base station before a radio resource control connection is established with the apparatus, a request for the apparatus to transmit a reference signal for identifying a location of the apparatus; and transmitting the reference signal based at least in part on the request received from the base station, wherein the reference signal is transmitted before or after the radio resource control connection is established (e.g., during a radio resource control connected state).

Aspect 51: The method of aspect 50, wherein the apparatus comprises a receiver and a transmitter.

Aspect 52: The method of aspect 50 or aspect 47, wherein the request is included in Message 2 or Message 4 of a random access procedure.

Aspect 53: The method of any of aspects 50 through 52, wherein the request indicates a periodicity for transmitting the reference signal, and wherein transmitting the reference signal comprises: transmitting the reference signal according to the periodicity indicated by the request.

Aspect 54: The method of aspect 53, wherein the request indicates a quantity of times the apparatus is to transmit the reference signal, and wherein transmitting the reference signal comprises: transmitting the reference signal the quantity of times indicated by the request.

Aspect 55: The method of any of aspects 53 through 54, further comprising: receiving from the base station an instruction to stop transmitting the reference signal.

Aspect 56: The method of any of aspects 50 through 55, wherein the request indicates a duration of time for the UE to periodically transmit the reference signal, and wherein transmitting the reference signal comprises: transmitting the reference signal periodically for the duration of time.

Aspect 57: The method of any of aspects 50 through 56, further comprising: determining a timing advance between the apparatus and the base station based at least in part on receiving the request; and transmitting an indication of the timing advance to the base station.

Aspect 58: A method for wireless communication at an apparatus, comprising: transmitting, to a UE in a coverage area of the apparatus, a request for the UE to transmit a reference signal periodically; monitoring a portion of the coverage area for the reference signal based at least in part on transmitting the request; and determining a location of the UE within the coverage area based at least in part on monitoring the portion of the coverage area for the reference signal.

Aspect 59: The method of aspect 58, wherein the apparatus comprises a receiver and a transmitter.

Aspect 60: The method of aspect 58 or aspect 55, further comprising: determining that the coverage area spans at least a first portion of a first country and at least a second portion of a second country, wherein the request is transmitted based at least in part on determining that the coverage area spans at least the first portion of the first country and at least the second portion of the second country.

Aspect 61: The method of any of aspects 58 through 60, further comprising: receiving the reference signal based at least in part on monitoring the portion of the coverage area, wherein the location of the UE is determined to be in the portion of the coverage area based at least in part on receiving the reference signal.

Aspect 62: The method of aspect 61, wherein the monitoring is performed by a second antenna with a second coverage area different than a first antenna associated with the coverage area, the method further comprising: determining a second location that is covered by the second coverage area when the reference signal is received, wherein the location of the UE is determined based at least in part on the second location that is covered by the second coverage area.

Aspect 63: The method of any of aspects 58 through 62, further comprising: determining that the apparatus has not received the reference signal while monitoring the portion of the coverage area, wherein the location of the UE is determined to be in a second portion of the coverage area based at least in part on not receiving the reference signal.

Aspect 64: The method of any of aspects 58 through 63, further comprising: receiving an indication of a timing advance between the UE and the apparatus based at least in part on the request; and determining the portion of the coverage area to monitor based at least in part on the timing advance.

Aspect 65: An apparatus (e.g., a UE) comprising a processing system comprising at least one processor and memory coupled with the at least one processor, the processing system configured to perform a method of any of aspects 1 through 10.

Aspect 66: An apparatus comprising at least one means for performing a method of any of aspects 1 through 10.

Aspect 67: A non-transitory computer-readable medium storing code the code comprising instructions executable by a processor to perform a method of any of aspects 1 through 10.

Aspect 68: An apparatus (e.g., a base station) comprising a processing system comprising at least one processor and memory coupled with the at least one processor, the processing system configured to perform a method of any of aspects 11 through 19.

Aspect 69: An apparatus for wireless communication at an apparatus, comprising at least one means for performing a method of any of aspects 11 through 19.

Aspect 70: A non-transitory computer-readable medium storing code for wireless communication at an apparatus, the code comprising instructions executable by a processor to perform a method of any of aspects 11 through 19.

Aspect 71: An apparatus (e.g., a UE) comprising a processing system comprising at least one processor and memory coupled with the at least one processor, the processing system configured to perform a method of any of aspects 20 through 36.

Aspect 72: An apparatus for wireless communication at an apparatus, comprising at least one means for performing a method of any of aspects 20 through 36.

Aspect 73: A non-transitory computer-readable medium storing code for wireless communication at an apparatus, the code comprising instructions executable by a processor to perform a method of any of aspects 20 through 36.

Aspect 74: An apparatus (e.g., a base station) comprising a processing system comprising at least one processor and memory coupled with the at least one processor, the processing system configured to perform a method of any of aspects 37 through 49.

Aspect 75: An apparatus for wireless communication at an apparatus, comprising at least one means for performing a method of any of aspects 37 through 49.

Aspect 76: A non-transitory computer-readable medium storing code for wireless communication at an apparatus, the code comprising instructions executable by a processor to perform a method of any of aspects 37 through 49.

Aspect 77: An apparatus (e.g., a UE) comprising a processing system comprising at least one processor and memory coupled with the at least one processor, the processing system configured to perform a method of any of aspects 50 through 57.

Aspect 78: An apparatus for wireless communication at an apparatus, comprising at least one means for performing a method of any of aspects 50 through 57.

Aspect 79: A non-transitory computer-readable medium storing code for wireless communication at an apparatus, the code comprising instructions executable by a processor to perform a method of any of aspects 50 through 57.

Aspect 80: An apparatus (e.g., a base station) comprising a processing system comprising at least one processor and memory coupled with the at least one processor, the processing system configured to perform a method of any of aspects 58 through 64.

Aspect 81: An apparatus for wireless communication at an apparatus, comprising at least one means for performing a method of any of aspects 58 through 64.

Aspect 82: A non-transitory computer-readable medium storing code for wireless communication at an apparatus, the code comprising instructions executable by a processor to perform a method of any of aspects 58 through 64.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The computer-program product may comprise packaging materials to advertise the computer-readable medium therein for purchase by consumers.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AA or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
   at least one processor; and
   memory comprising codes executable by the least one processor to cause the apparatus to:
   obtain a request for the apparatus to report condensed location information of the apparatus, the condensed location information comprising fewer bits than information associated with a full global navigation satellite system coordinate of the apparatus; and
   output, for transmission, the condensed location information based at least in part on location of the apparatus and the request, wherein the location of the apparatus is based on a coordinate differential that comprises a difference between a first geographic coordinate of a reference location and a second geographic coordinate of the apparatus, the request indicates the reference location, and the condensed location information comprises the coordinate differential.

2. The apparatus of claim 1, further comprising:
   a receiver configured to receive the request; and
   a transmitter configured to transmit the condensed location information, wherein the apparatus is configured as a user equipment.

3. The apparatus of claim 1, wherein the location of the apparatus is based on a geographic coordinate comprising a set of digits,
   the request indicates a subset of digits of the set of digits, and the condensed location information comprises a truncated version of the geographic coordinate that is based at least in part on the subset of digits.

4. The apparatus of claim 3, wherein the geographic coordinate represents a longitude of the apparatus or a latitude of the apparatus.

5. The apparatus of claim 1, wherein the at least one processor is further configured to cause the apparatus to:
obtain the first geographic coordinate of the reference location from a base station.

6. The apparatus of claim 1, wherein the location of the apparatus is associated with an angle associated relative to a reference ray with a starting point at a reference location, wherein the request indicates the reference ray and the condensed location information comprises the angle.

7. The apparatus of claim 6, wherein the at least one processor is further configured to cause the apparatus to:
obtain, from a base station, an indication of the reference location and an orientation of the reference ray associated with the reference location, wherein the reference ray is based at least in part on the indication of the reference location and the orientation.

8. The apparatus of claim 6, wherein the at least one processor is further configured to cause the apparatus to:
obtain, from a base station, an indication of the reference location, wherein the reference ray is based at least in part on the reference location and an orientation of the reference ray associated with the reference location.

9. The apparatus of claim 1, wherein the condensed location information is outputted during a random access procedure or after the random access procedure is successfully completed.

10. An apparatus for wireless communication, comprising:
at least one processor; and
memory comprising codes executable by the least one processor to cause the apparatus to:
output, for transmission to a user equipment (UE), a request for the UE to report condensed location information of the UE to the apparatus, the condensed location information comprising fewer bits than information associated with a full global navigation satellite system coordinate of the UE;
obtain the condensed location information based at least in part on outputting the request; and
communicate with the UE based at least in part on location of the UE, wherein the location of the UE is based on a coordinate differential that comprises a difference between a first geographic coordinate of a reference location and a second geographic coordinate of the UE, the request indicates the reference location, and the condensed location information comprises the coordinate differential.

11. The apparatus of claim 10, wherein a subset of digits of a geographic coordinate is based at least in part on a threshold precision for a beam management procedure with the UE,
the request indicates the subset of digits, and
the condensed location information comprises a truncated version of the geographic coordinate that is based at least in part on the subset of digits.

12. The apparatus of claim 11, the threshold precision is based at least in part on a size of a coverage area of a transmission beam of the apparatus, a shape of the coverage area, or a combination thereof.

13. The apparatus of claim 10, wherein the at least one processor is further configured to cause the apparatus to:
output, for transmission to the UE, a first geographic coordinate for a reference location, wherein the condensed location information comprises a coordinate differential comprising a difference between the first geographic coordinate of the reference location and a second geographic coordinate of the UE.

14. The apparatus of claim 13, wherein the at least one processor is further configured to cause the apparatus to:
select a center of a transmission beam of the apparatus as the reference location.

15. The apparatus of claim 10, wherein the request indicates a reference ray,
the condensed location information comprises an angle of a position of the UE relative to the reference ray, and
the location of the UE is based at least in part on the angle.

16. The apparatus of claim 15, wherein the location of the UE is based at least in part on a propagation delay between the UE and the apparatus and the angle.

17. The apparatus of claim 15, wherein the at least one processor is further configured to cause the apparatus to:
output, for transmission to the UE, an indication of a reference location associated with the reference ray, wherein the angle is based at least in part on the reference location and an orientation of the reference ray.

18. The apparatus of claim 10, further comprising:
a receiver configured to receive the condensed location information; and
a transmitter configured to transmit the request, wherein the apparatus is configured as a base station.

19. An apparatus for wireless communication, comprising:
at least one processor; and
memory comprising codes executable by the least one processor to cause the apparatus to:
obtain a request for the apparatus to report condensed location information; and
output the condensed location information for transmission during a radio resource control connected state or a radio resource control connected state, wherein a location of the apparatus is based on a coordinate differential that comprises a difference between a first geographic coordinate of a reference location and a second geographic coordinate of the apparatus, the request indicates the reference location, and the condensed location information comprises the coordinate differential.

20. The apparatus of claim 19, further comprising:
a receiver configured to receive the request; and
a transmitter configured to transmit the condensed location information, wherein the apparatus is configured as a user equipment.

* * * * *